(12) United States Patent
Gordon et al.

(10) Patent No.: US 6,604,629 B2
(45) Date of Patent: *Aug. 12, 2003

(54) PLUG PACKAGING DEVICE FOR DISC-SHAPED ITEMS AND RELATED MATERIALS AND METHOD FOR PACKAGING SUCH DISCS AND METERIAL

(75) Inventors: Alexandra Gordon, Bedford, NY (US); Charles W. Grimes, Darien, CT (US); William L. Plumb, Piermont, NY (US)

(73) Assignee: Avecmedia, Inc., Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/916,871

(22) Filed: Jul. 27, 2001

(65) Prior Publication Data

US 2002/0046959 A1 Apr. 25, 2002

Related U.S. Application Data

(63) Continuation-in-part of application No. 09/565,342, filed on May 5, 2000, now Pat. No. 6,349,821, which is a continuation-in-part of application No. 09/161,064, filed on Sep. 25, 1998, now Pat. No. 6,216,857.

(51) Int. Cl.$^7$ ............................................... B65D 85/57

(52) U.S. Cl. ................................... 206/232; 206/308.1

(58) Field of Search .................. 53/471, 474; 206/216, 206/217, 303, 307, 308.1, 310; 215/227, 228; 220/212, 256, 258, 501, 521, 522

(56) References Cited

U.S. PATENT DOCUMENTS 1,464,827 A * 8/1923 Morrison .................... 206/309

(List continued on next page.)

*Primary Examiner*—Jim Foster
(74) *Attorney, Agent, or Firm*—Grimes & Battersby, LLP; Gregory J. Battersby; James G. Coplit

(57) ABSTRACT

An elongated packaging device is provided for packaging at least one disc-shaped item such as, for example, a recording media disc such as a CD, a CD-ROM or a DVD, together with other materials relating to such disc or otherwise in a stacked relationship. The packaging device includes a first member provided with a first chamber and a first opening, and a second member provided with a second chamber and a second opening for the storage of other materials in such second chamber. The first member may include an inner structure defining central support for the disc media by means of interaction of such inner structure with the annular opening at the center of the disc media, such that the disc media is allowed to rotate, while limiting the linear movement of the disc media both perpendicular to and parallel to the plane of the media. Alternatively, the disc-shaped media may be retained and supported within an envelope that may be attached either to the lid or the first member, or within a protective element having corresponding, interlocking elements attached by means of a flexible hinge, said protective element being having a generally clam shell-like shape. Other means of retaining and supporting the disc-shaped media include a removable safety seal or shrink-wrapped plastic attached about the opening to the chamber within the first member, or by means of a plurality of tabs or protrusions disposed about the internal diameter of the chamber within the first member, said tabs being positioned so as to suspend the disc-shaped media above the bottom surface of the chamber. The lid is then engaged with and secured to the first member by means of a compression fit, although other attachment means, such as snaps, tabs, adhesives, and the like are contemplated. Once stored within the first member, access to the disc-shaped media may be obtained by removing the lid, or alternatively, by splitting or breaking the first member along a scored line. If a shrink wrap or safety seal have been used, either a tab or other similar means for removing the seal or the wrap should also be provided. The first member with lid affixed is then inserted into and engaged with the second opening to the second chamber such that the combined first member and affixed lid serve to close and seal the second opening to the second chamber. The means for engagement include a variety of conventional attaching means, such as a compression fit, or, alternatively, snapping the combined first member and lid into the opening, screwing the combined first member and lid into the opening, or using fins on the exterior surface of the first member to frictionally engage with the inner surface of the second member. A method is further provided for packaging such disc-shaped item and other material within the packaging device.

41 Claims, 16 Drawing Sheets

U.S. PATENT DOCUMENTS

| | | | | |
|---|---|---|---|---|
| 1,940,088 A | * | 12/1933 | Harrison | 206/309 |
| 2,020,381 A | * | 11/1935 | Labowitz et al. | 206/309 |
| 3,047,199 A | * | 7/1962 | McBain | 220/212 |
| 3,556,339 A | * | 1/1971 | Lind et al. | 220/787 |
| 4,535,888 A | * | 8/1985 | Nusselder | 206/308.1 |
| 4,978,004 A | * | 12/1990 | Silverstein et al. | 220/288 |
| 5,284,243 A | * | 2/1994 | Gelardi et al. | 206/308.1 |
| 5,542,531 A | * | 8/1996 | Yeung | 206/308.1 |
| 5,586,651 A | * | 12/1996 | Krummenacher | 206/310 |
| 5,697,498 A | * | 12/1997 | Weisburn et al. | 206/308.1 |
| 5,816,394 A | * | 10/1998 | O'Brien et al. | 206/308.1 |
| 5,819,929 A | * | 10/1998 | Chung | 206/308.1 |
| 6,070,752 A | * | 6/2000 | Nava et al. | 220/521 |
| 6,196,411 B1 | * | 3/2001 | Nava et al. | 220/521 |

* cited by examiner

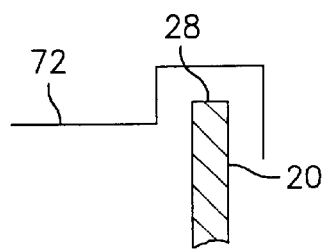
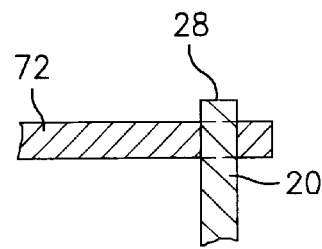
FIG. 6A    FIG. 6B
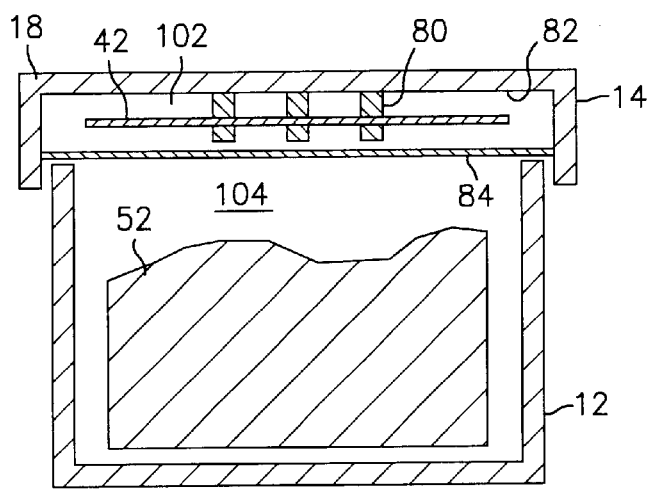
FIG. 7
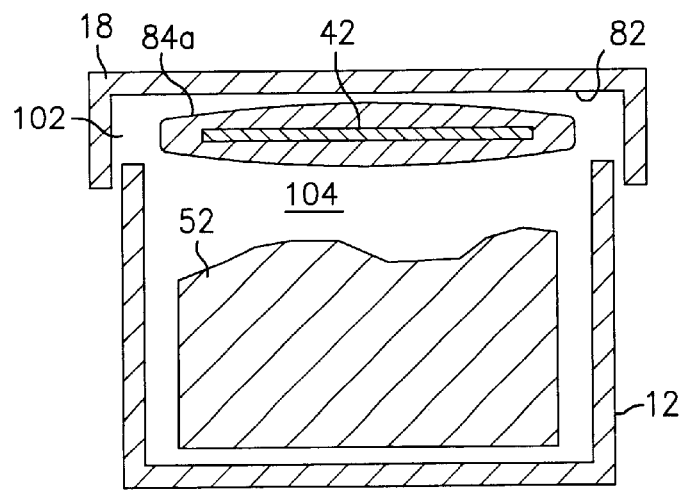
FIG. 7A

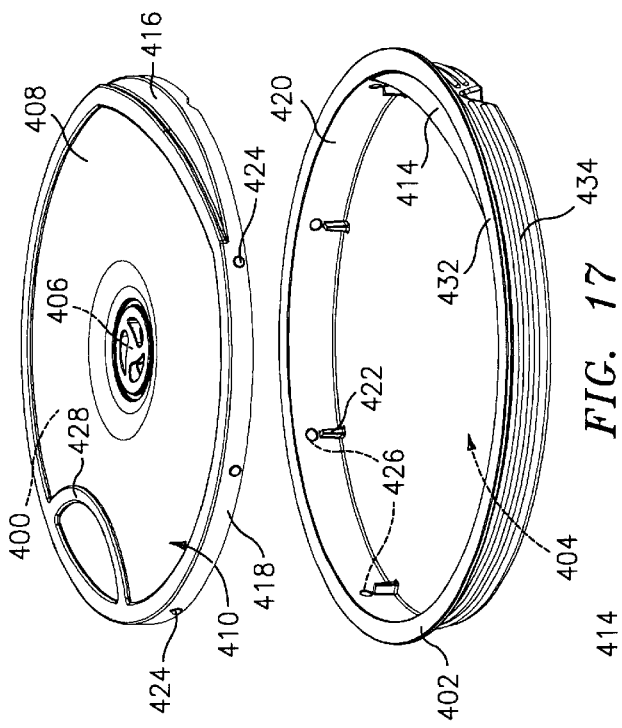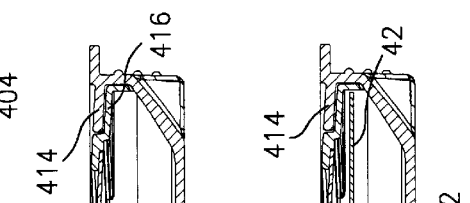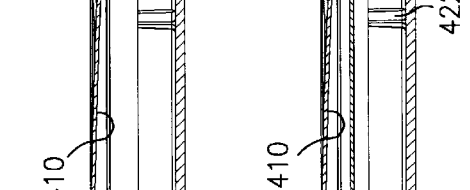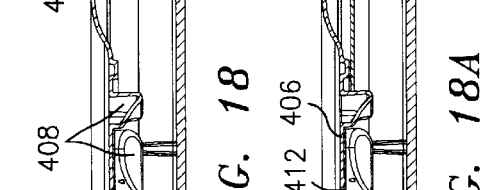

PLUG PACKAGING DEVICE FOR DISC-SHAPED ITEMS AND RELATED MATERIALS AND METHOD FOR PACKAGING SUCH DISCS AND METERIAL

RELATED APPLICATIONS

This is a continuation-in-part of co-pending U.S. patent application Ser. No. 09/565,342 filed on May 5, 2000 in the names of Alexandra Gordon and Charles W. Grimes for "Plug Packaging Device for Disc-Shaped Items and Related Materials and Method for Packaging Such Disks and Material", U.S. Pat. No. 6,349,821, which, in turn, was a continuation-in-part of co-pending U.S. patent application Ser. No. 09/161,064 filed on Sep. 25, 1998, now U.S. Pat. No. 6,216,857 in the names of Alexandra Gordon and Charles W. Grimes for "Packaging Device for Disc-Shaped Items and Related Materials and Method for Packaging Such Disks and Material."

BACKGROUND OF THE INVENTION

1. Field of the Invention

This invention relates, in general, to a device for packaging and displaying a circular or disc-shaped media and other materials and a method for packaging such disc-shaped media and other materials and, in particular, to containers and methods for initially packaging and thereafter repeatedly storing disc-shaped media together with or without other materials.

Still more particularly the present invention relates to a new and improved container for initially packaging and thereafter repeated storing of disc-shaped media and other materials in stacked relationship, having a first chamber and a second chamber stacked on top of one another for respectively receiving and securely retaining the disc media and the other materials.

Still more particularly the present invention further relates to a new and improved method for initially packaging and thereafter repeated storing of media and other materials in stacked relationship, wherein in a preferred embodiment the media is releasably retained within the first container such that the media is permitted to move rotationally while being limited in linear movement both perpendicularly and parallel to the plane of the media, and the other materials are placed inside an open ended second container. The first container is then inserted into the second container through the open end and releasably attached to the second container such that the first container serves to seal the open end of the second container.

2. Background of the Invention

Packaging and storage devices for media are generally known. Disc-shaped media, such as CD's, DVD's or CD-ROM's, encounter special problems in handling, packaging and storage due to their delicate, flat recorded surfaces. Such disc media is generally sold in plastic cases which are sometimes referred to as "jewel boxes." Such cases are generally rectangular and have a mounting hub for holding the disc media by its center aperture. Such cases are usually kept after purchase of the disc media and utilized for re-packaging of the disc media between usage. Such jewel boxes are impractical packaging containers for shipping because of their small dimensions and easy breakage, and they thus require substantial additional packaging material or placement in larger shipping containers.

Disc media is routinely sold with other materials (whether directly related to the content of the disc media, i.e., ancillary, or otherwise). At the present time, disc media in such "jewel boxes" is commonly packaged together with ancillary materials in larger rectangular shaped cardboard boxes for shipping, sale and packaging. The "jewel boxes" are necessary to reliably protect the disc media from contact with the ancillary materials in the larger cardboard boxes. Such plastic case/cardboard box combination package arrangements are not only expensive, they also do not lend themselves to easy and secure repeated re-storage of the disc media and ancillary materials. They are often damaged during initial opening and repeated re-storage. They are often unable after initial opening to securely re-store the disc media (in the jewel box) and the other materials together in the cardboard packaging in a manner to preclude contact with each other. They frequently become unsightly after initial opening and repeated re-storage. They are, themselves, difficult to handle and store.

Other types of packaging and storage devices are needed to organize, protect, ship, display at retail and store disc media sold and/or shipped in combination with ancillary materials.

A need also exists for devices which can effectively and efficiently organize, protect, ship, display at retail and store disc shaped media with other materials.

An opportunity exists that is not being commercially exploited at the present time to distribute disc-shaped recording media with materials that are either ancillary or wholly unrelated to the content of the disc media. This opportunity arises in connection with delivery of purchases to catalog, e-commerce, and other "shop-at-home" customers, as well as for the distribution of free-standing-insert type advertising, samples, business-to-business communications and other forms of direct marketing and retail sales. This opportunity is not being exploited due to the lack of an effective container design and method for efficiently organizing, protecting, shipping, displaying at retail and storing disc-shaped media packaged with other materials.

SUMMARY OF THE INVENTION

One important object of this invention is to provide a container in which and a method whereby disc-shaped media and ancillary materials can initially be packaged together in stacked relationship and, after removal and use, they can easily be re-stored in stacked relationship in a manner so as to avoid contact therebetween.

Another object of this invention is to provide a container and a method of packaging that eliminates the need for a separate case (i.e., the need for a "jewel box") for the disc media.

Another object of this invention is to provide a container and a method of packaging whereby during initial storage, shipping, retail presentation and re-packaging disc media is securely held against movement and protected.

Another important object of this invention is to provide a shipping container in which and a method of packaging whereby disc-shaped media and other materials can be packaged, presented, conveyed, distributed and stored.

Another important object of this invention is to provide an aesthetically unique and compelling device and method for presenting at retail disc-shaped media and other materials which may or may not be related to the content of the media.

Another object of this invention is to provide a container and a method of packaging whereby the internal wall of a first chamber of a first member of the container is cylindrical in shape and of a diameter slightly larger than the external diameter of the disc media to thus retain the disc media in the first chamber of the first member of the container against movement in the plane of the disc media.

Another object of this invention is to provide a container and a method of packaging whereby either an annular ring or protrusions mounted on the internal wall of the first chamber of the first member of the container define an opening slightly larger in internal diameter than the external diameter of the disc media into which the disc media can be inserted to thus retain the disc media in the first chamber of the first member of the container against movement in the plane of the disc media.

Another object of this invention is to provide a container and a method of packaging whereby either an annular lip or protrusions extend from the internal wall of the first chamber of the first member of the container and define an opening slightly smaller in internal diameter than the external diameter of the disc media on which the disc media can seat to thus retain the disc media in the first chamber of the first member of the container against movement in a first direction perpendicular to the plane of the disc media.

Another object of this invention is to provide a container and a method of packaging whereby the container has a removable lid that attaches to the first member of the container after the disc media has been either initially positioned or subsequently re-stored on the seat and that retains the disc media against movement in a second, opposite direction perpendicular to the plane of the disc media.

Another object of this invention is to provide a container and a method of packaging whereby the first member and lid are removable and the first member and lid alone can be combined to create a permanent storage and restoring package for the disc media alone.

Another object of this invention is to provide a container and a method of packaging whereby an annular ring or protrusions mounted on the internal wall of the first chamber of the first member of the container define an annular post slightly smaller in exterior diameter than the diameter of the center hole of the disc media to thus retain the disc media on the post in the first chamber of the first member of the container against movement in the plane of the disc media.

Another object of this invention is to provide a container and method of packaging whereby the first chamber is within the removable lid.

Another object of this invention is to provide a container and method of packaging whereby the first chamber is within the removable lid and the disc media support member is a center post fixedly attached to and extending from either the inside center of the lid or the center of the base of the first chamber.

Another object of this invention is to provide a container and method of packaging whereby the disc is retained in the plug and protected by a lid that nests within the plug.

Still another object of this invention is to provide a container and method of packaging whereby the disc is retained in the plug and protected by a lid that covers the plug.

Yet another object of this invention is to provide a container and method of packaging whereby the disc is retained in the plug and protected by a lid that covers both the plug and packaging container.

Another important object of this invention is to provide a container and method of packaging whereby the disc media is supported within the first member by means of center support and retained therein by sealing means such as shrink wrapped plastic, foil seal, or paperboard seal.

Still another object of this invention is to provide a container and method of packaging whereby the disc media is supported within the first member by means of a protective envelope.

Another object of this invention is to provide a container and method of packaging whereby the disc media is supported within the first member by means of a protective element having corresponding interlocking members attached by a flexible hinge.

Still another object of this invention is to provide a container and method of packaging whereby the plug is adapted to break open and fold back along a predetermined line so as to create a side opening into the cavity thereby allowing unfettered slidable insertion of the disc-shaped media into the cavity at a level beneath the opening of the plug in its closed position.

But another object of this invention is to provide a container and method of packaging whereby the plug includes projections disposed between the point of introduction of the disc and the opening so as to prevent the disc from being extracted through the opening.

Another object of this invention is to provide a container and method of packaging whereby the plug breaks open and includes mating faces at the points where the sidewall is cut so as to ensure locking engagement in a closed position.

Still another object of this invention is to provide a container and method of packaging whereby the plug breaks open so as to allow insertion of the disc, whereby the disc is first loaded onto a center support structure of a lid and the combined lid and disc can be slid into the plug through the side opening.

Yet another object of this invention is to provide a container and method of packaging whereby the plug breaks open so as to allow insertion of the disc and whereby the disc is first loaded onto a center support structure of a lid, wherein the side walls of the lid are dimensioned to engage the floor and the underside of the projections in an abutting relationship to positively hold the lid in the plug.

To accomplish these and other objects, the container of this invention in its preferred form comprises a first member provided with a first chamber, a first opening and a removable lid for closing such first opening, and a second member provided with a second chamber and a second opening for the storage of other materials in such second chamber. Either the first member or the lid may include an inner structure defining central support for the disc media by means of interaction of such inner structure with the annular opening at the center of the disc media, such that the disc media is allowed to rotate, while limiting the linear movement of the disc media both perpendicular to and parallel to the plane of the media. The inner structure in the preferred form includes projections which cooperate to provide secure support for the disc shaped media. Alternatively, the disc-shaped media may be retained and supported within an envelope that may be attached either to the lid or the first member, or within a protective element having corresponding, interlocking elements that may be attached by means of a flexible hinge, said protective element having a generally clam shell-like shape. Other means of retaining and supporting the disc-shaped media include within the first member a removable shrink-wrapped plastic, foil seal or paperboard seal attached about the opening to the first chamber within the first member, or by means of a plurality of tabs or protrusions disposed about the internal diameter of the first chamber within the first member, said tabs being positioned so as to suspend the disc-shaped media above the bottom surface of the chamber. The lid may beengaged with and secured to the first member by means of a compression fit, although other attachment means, such as snaps, tabs, adhesives, and the like are contemplated. Once stored within the first member, access to the disc-shaped media may be obtained by removing the lid, shrink wrapped plastic, foil seal or paperboard seal. In an alternative embodiment, access to the first chamber of the first member may be achieved through a side opening create by splitting or breaking the first member along a preset line extending across the floor of the first member between opposed points on the side wall that have been cut. The disc alone may be slid into the plug throught the side opening or the disc may be mounted on a center support structure of the lid and the combined disc and lid can be slid into the plug through the side opening. If a shrink wrap, foil seal or paperboard seal has been used, either a tab or other similar means for removing the seal is also provided. Alternatively, if complete sealing of the disc in the plug is not required, the seal member can have a notched-out area along its periphery to allow finger access between the seal and the plug side wall so the seal can be grabbed and removed. The first member with lid affixed is then inserted into and engaged with the second opening to the second chamber such that the combined first member and affixed lid serve to close and seal the second opening to the second chamber. The means for engagement include a variety of conventional attaching means, such as a compression fit or, alternatively, snapping the combined first member and lid into the opening, screwing the combined first member and lid into the opening, or using fins on the exterior surface of the first member to frictionally engage with the inner surface of the second member.

In the preferred method of packaging, disc media is inserted into and releasably retained within the first chamber of the first member, and the lid is then removably attached to the first opening of the first chamber by means of a compression fit, snaps or tabs. The other materials are inserted into the second opening of the second member, either before or after the loading of the disc-shaped media, and then the combined first member and lid are inserted into the second opening in the second member such that the combined first member and lid serve to close and seal the second opening to the second chamber in the second member. Alternate methods include inserting the disc-shaped media into the first member and sealing it therein by means of shrink-wrapped plastic, foil seal or paperboard seal. Another such alternative method includes inserting the disc-shaped media into a protective element prior to loading the protective element into the first member. In yet another alternative method, the disc-shaped media may be first inserted into a lid and the lid then attached to the first member, which member is then inserted into the second member.

The above, as well as additional objects, features and advantages of the invention will become apparent in the following detailed description.

BRIEF DESCRIPTION OF THE DRAWING

The novel features believed characteristic of the invention are set forth in the appended claims. The invention itself, however, as well as the preferred mode of use, further objects and advantages thereof, will best be understood by reference to the following detailed description of illustrative embodiments when read in conjunction with the accompanying drawings, wherein:

FIGS. 6A and 6B are cross-sectional views of alternate embodiments of the packaging device of the present invention depicting two different methods of mounting the disc media support member to the device outer wall;

FIG. 7 is a cut-away, cross-sectional side view of an alternative embodiment of the present invention with disc media and other materials inserted, the protective element inserted and the lid closed, in which the first chamber in which the disc media is stored is in the cover;

FIG. 7A is a cut-away, cross-sectional side view of an alternative embodiment of the device shown in FIG. 7, wherein the disc media is inserted into a protective envelope that is affixed to the inner surface of the cover;

FIG. 16 is a perspective view of another embodiment of the novel disc packaging device of the present invention in which the disc media is retained in a lid, which lid is engaged and retained within a container by means of an arcuate lip and tab or snap means, and the entire container and lid structure is then inserted into the opening of another container (not shown) containing other materials;

FIG. 17 is an exploded perspective view of the embodiment of FIG. 16;

FIG. 18 is a cut-away, cross-sectional view of the embodiment of FIG. 16 along line G—G;

FIG. 18A is a cut-away, cross-sectional view of the embodiment of FIG. 16 along line G—G showing the disc media retained therein;

DETAILED DESCRIPTION OF THE INVENTION

Figure 1:
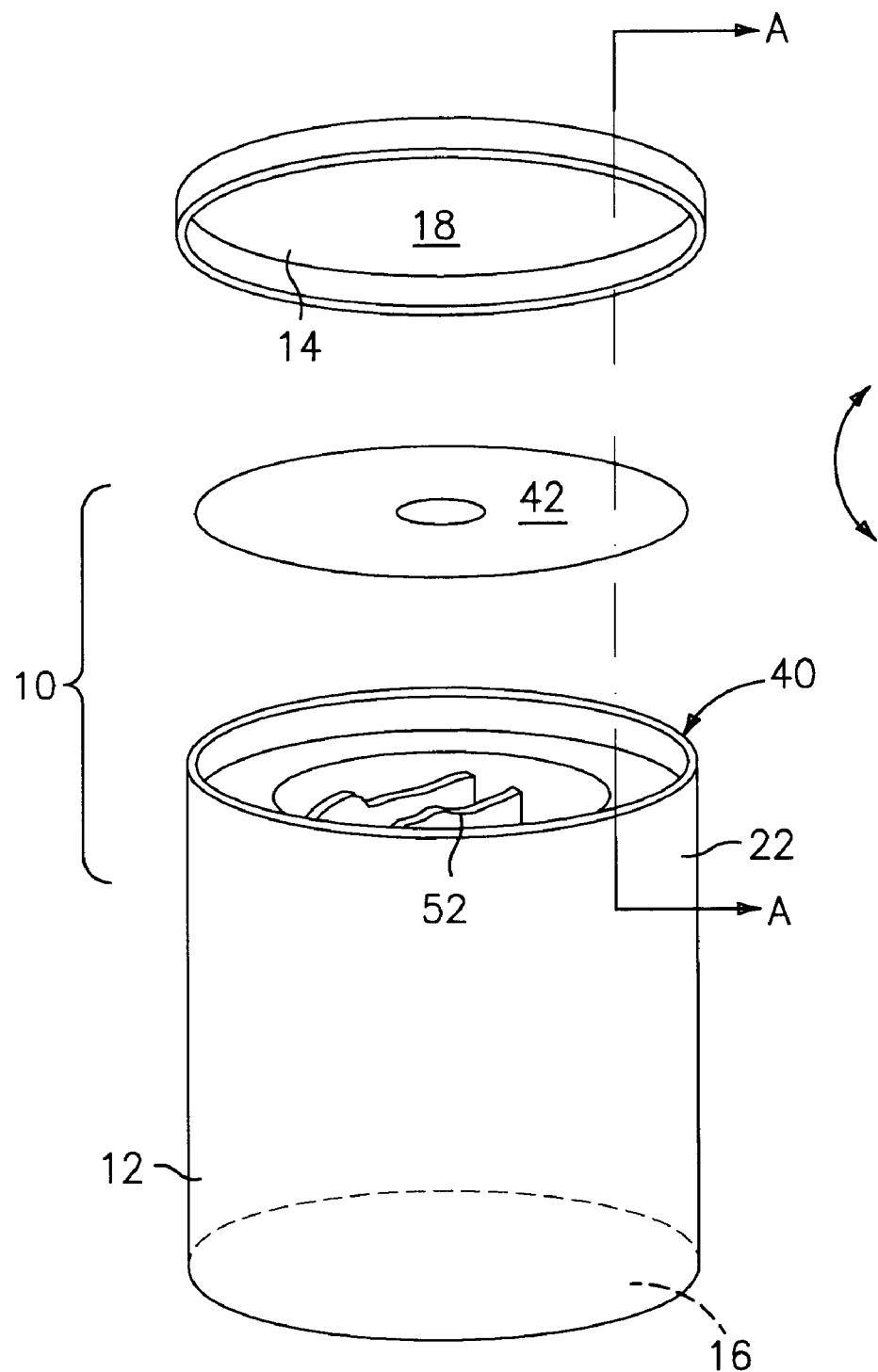
FIG. 1 is an exploded perspective view of the novel disc packaging device of the present invention with the lid and disk media removed, illustrating the use of a one-piece annular collar member with an annular ring and lip.

With reference now to the figures and in particular with reference to FIG. 1, there is shown a front view of the disc packaging device 10 of the present invention. As illustrated, disc packaging device 10 includes a lower base component or container 12 and an upper cover component or lid 14. Lower base component 12 and upper cover component 14 are utilized to form a generally cylindrical packaging device of dimension slightly larger than the disc shaped recording media to be stored. End plates 16 and 18 cooperate with lower base component 12 and upper cover component 14 to fully enclose the cylindrical packaging space defined thereby.

Figure 2:
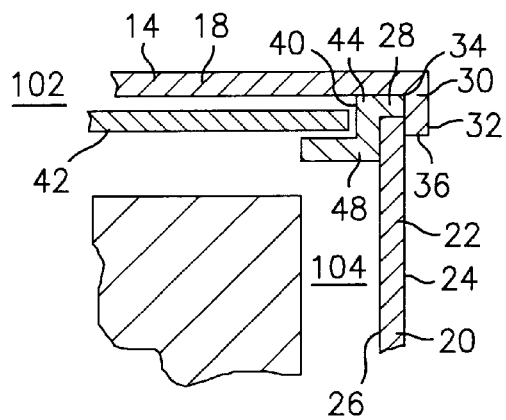
FIG. 2 is a cut-away, cross-sectional side view of a portion of the novel disc packaging device of FIG. 1 when the lid is on the container, along line AA illustrating the resultant first and second chambers thereof.

The lower base component 12 of the embodiment of this invention shown in FIGS. 1 and 2 includes a side wall 20. The side wall can be constructed from either cardboard (i.e., natural fiber material) or plastic (i.e., man-made synthetic material) or other material suitably rigid for the base component to retain its shape, including metal, e.g., as in a vacuum sealed, canned product.

The base component 12 can be designed to threadably receive the bottom plate 16 which is of conventional design, made of stiff cardboard, plastic, metal or some similarly rigid material and used as a cover-all screw cap on a very wide variety of containers. Alternatively the bottom plate 16 can nest inside the side wall 20 where it is held by friction, stapling, gluing or some other means. The side wall 20 has an upper section 22 and the upper section 22 can be threaded to accommodate the upper cover component 14 although in the embodiment shown in FIGS. 1 and 2 the cover is made of plastic and snaps on in a conventional manner.

As best seen in FIG. 2, the upper section 22 is defined by an outer wall 24, an inner wall 26 and a rim 28. The cover component 14 has a side wall 30 defined by an outer wall 32, an inner wall 34 and a rim 36. The diameter of the inner wall 34 of the cover component is slightly greater than the diameter of the outer wall 24 of the base component. In the embodiment shown in FIGS. 1 and 2, there is an inner structure 40 which provides circumferential support for a disc shaped media 42 stored within the packaging device 10. The structure 40 comprises an annular collar 44 having an annular ring 46 and an annular lip 48. The inner structure 40 nests within the lower base component 12. The annular collar 44 has an outer diameter greater than the diameter of the inner wall 26 of the base component such that the annular collar extends beyond the inner wall 26 and sits on top of the base rim 28. The annular ring 46 has an outer diameter less than the diameter of the inner wall 26, such that the annular ring nests inside the inner wall 26. The annular lip 48 has an inner diameter less than the outer diameter of the disc shaped media 42. Thus, the disc shaped media will rest on the annular lip, inside the annular ring. In this way, movement of the disc shaped media in the plane of the disc shaped media is precluded by the annular abutment 46. Movement of the disc shaped media perpendicular to its plane is prevented in one direction by the annular lip 48. When the cover component 14 is affixed to the base component 12, the cover plate 18 acts to preclude movement of the disc shaped media in the opposite perpendicular direction to the plane of the disc shaped media.

Figure 2A:
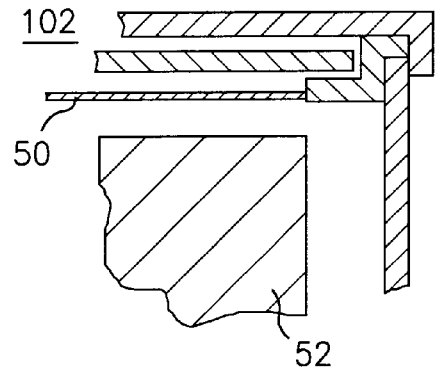
FIG. 2A is an alternative embodiment of the device shown in FIG. 2, wherein a protective element is inserted between the first and second chambers.

In the embodiment disclosed in FIG. 2A, a protective member 50 is attached to the annular lip 48. The protective member can be made of plastic film or any other conventional material to provide a barrier between the disc shaped media and other materials 52 which can be stored in the base component 12 of the packaging device 10. The protective member can be permanently affixed to the annular lip or it can be affixed at the time of assembly and shipment and removed by the consumer after purchase, i.e., at a time when further "rough handling" that would cause interaction between the disc shaped media and the other materials is less likely to occur.

Figure 2B:
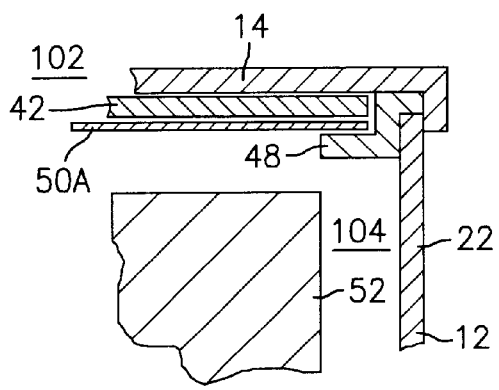
FIG. 2B is an alternative embodiment of the device shown in FIG. 2A, showing an alternative method of insertion of the protective element between the first and second chambers.

In an alternative embodiment disclosed in FIG. 2B, the protective element is removable and sized to seat on the annular lip 48 between the annular lip 48 and the disc shaped media. The protective element is round like the disc shaped media and has a central opening into which one's finger can be inserted to engage, lift and remove the protective element and subsequently engage, lift and replace the protective element.

Figure 2C:
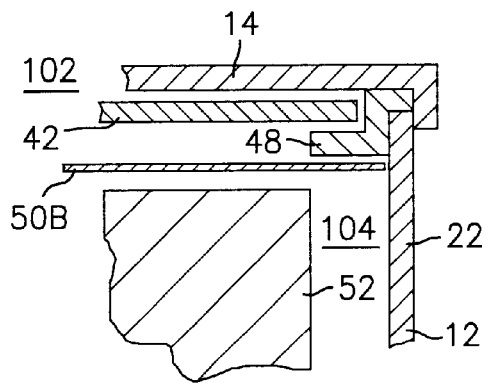
FIG. 2C is a further alternative embodiment of the device shown in FIG. 2A, showing, a further alternative method of insertion of the protective element between the first and second chambers.

In an alternative embodiment disclosed in FIG. 2C, the protective element 50B is flexible and is removably inserted within the lower base component beneath the annular lip 48 and on top of the other materials 52 placed therein. The protective element is sized to correspond to the interior wall 26 and has a central opening into which one's finger can be inserted to engage, lift and remove the protective element and subsequently engage, lift and replace the protective element. Alternatively, the protective element can be provided with a lift tab or some other conventional means whereby it can be grabbed and removed.

Figure 3:
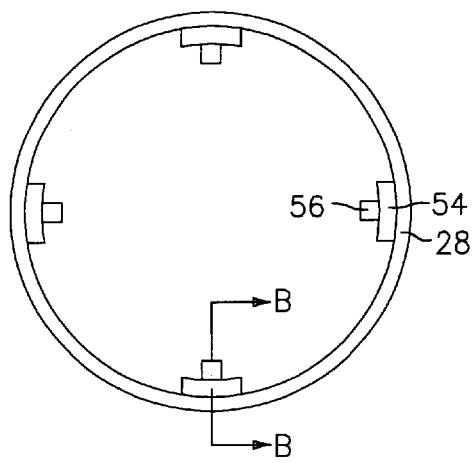
FIG. 3 is a top plan view of the novel disc packaging device of the present invention illustrating the alternative use of abutments and protrusions affixed to the inside wall of the container.
Figure 3A:
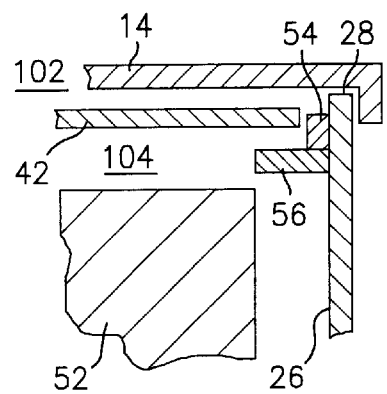
FIG. 3A is a cut-away, cross-sectional side view of a portion of the device shown in FIG. 3, along line B—B, with a disc media and other materials inserted and the lid affixed.

In the alternative embodiment shown in FIGS. 3 and 3A, the inner structure 40 is modified. The annular collar 44 with annular ring 46 and annular lip 48 is replaced. by discrete abutments 54 and discrete protrusions 56. Collectively, the abutments 54 and protrusions 56 are positioned within the lower base component 12 around the circumference of the inner wall 26 spaced below the rim 28, affixed to the inner wall 26, so as to perform the same function as the annular ring 46 and annular lip 48. Specifically, the abutments 54 preclude movement of the disc shaped media in the plane of the disc shaped media i.e., performing the same function as the annular ring 46. Similarly, the protrusions 56 are positioned about the inner wall 26 and collectively preclude movement of the disc shaped media in a direction perpendicular to plane of the disc shaped media i.e., performing the same function as the annular lip 48.

Figure 3B:
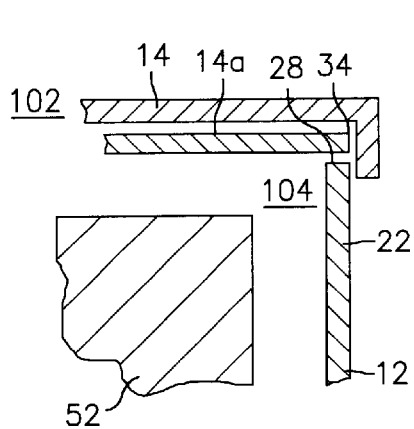
FIG. 3B is a cut-away, cross-sectional side view of an alternative embodiment of the novel disc packaging device of the present invention illustrating the alternative use of the upstanding rim of the base and the inside wall of the cover in place of the abutments and protrusions of FIG. 3.

FIG. 3B shows a further alternative embodiment wherein the disc shaped media is seated on the rim 28 and movement of the disc shaped media perpendicular to its plane is prevented in one direction by the rim 28. When the cover 14 is affixed to the base component 12, movement of the disc shaped media in the plane of the disc shaped media is precluded by the inner wall 34 of the cover 14 and inner surface 14a of the cover 14 acts to preclude movement of the disc shaped media in the second, opposite perpendicular direction to the plane of the disc shaped media.

Figure 3C:
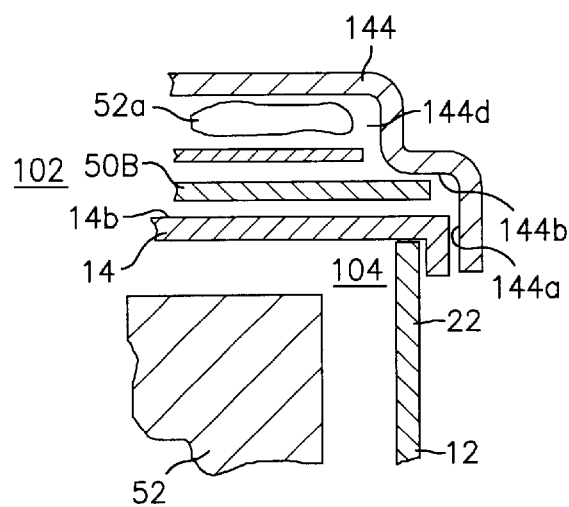
FIG. 3C is a cut-away, cross-sectional side view of an alternative embodiment of the novel disc packaging device of the present invention illustrating the alternative use of the outer surface of the cover and the inner surface of a supplementary cover in place of the abutments and protrusions of FIG. 3.

FIG. 3C shows a further alternative embodiment wherein the disc shaped media is seated on the outside surface 14b of the cover 14 and movement of the disc shaped media perpendicular to its plane is prevented in one direction by a supplementary cover 144 that snaps onto the cover 14. When the supplementary cover 144 is affixed to the cover 14, movement of the disc shaped media in the plane of the disc shaped media is precluded by the inner wall 144a of the supplementary cover 144 and the inner wall 144b of the supplementary cover 144 acts to preclude movement of the disc shaped media in the second, opposite perpendicular direction to the plane of the disc shaped media. The supplementary cover 144 can include a chamber 144d and a protective element 50b can be inserted to prevent contact between the disc shaped media and whatever materials 52a are placed in the chamber 144d.

Figure 4:
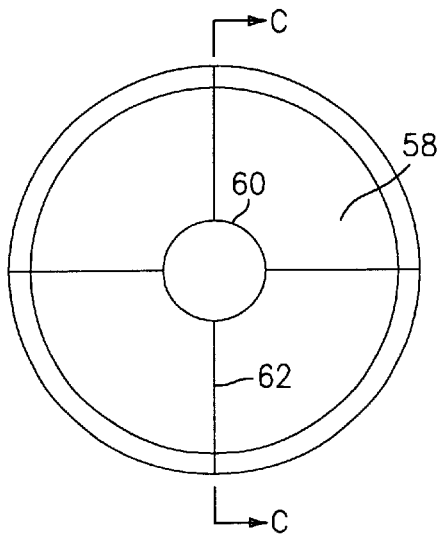
FIG. 4 is a top plan view of the novel disc packaging device of the present invention illustrating the alternative use of a center annular post support for the disc media suspended from spokes.
Figure 4A:
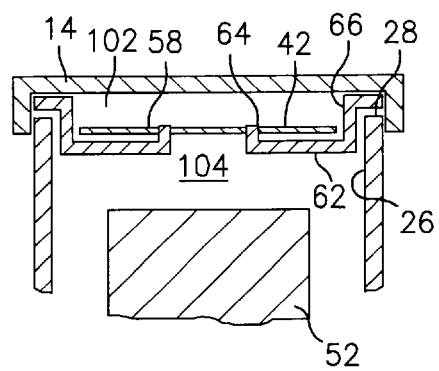
FIG. 4A is a cut-away, cross-sectional side view of the device shown in FIG, 4, along line C—C, with a disc media and other materials inserted and the lid affixed.

In the alternative embodiment seen in FIGS. 4 and 4A, the inner support structure 40 is replaced with an inner support structure 58 that provides center support for the disc shaped media as opposed to the circumferential support provided by inner structure 40. In the embodiment shown in FIGS. 4 and 4A, the alternative inner structure 58 includes an annular ring 60 and spokes 62 extending therefrom. As seen in FIG. 4A, the annular ring 60 has a raised portion 64 on which the disc media 42 sits, The spokes 62 each have a finger portion 66 which extends upwardly and outwardly such that when the structure 58 is inserted into the base component 12, the fingers 56 frictionally engage the inner wall 26 and sit on the upper rim 28. The structure 58 can include webbing between the fencers 56 (ala the webbing in a duck's foot) comprised of a thin material to provide protection for the disc shaped media 42 from the other materials 52. Inside the annular ring 60 would be left open to allow the consumer, after removing, the cover 14, to insert their finger into the annular ring and to thereby remove both the disc shaped media 42 and the structure 58.

Figure 5:
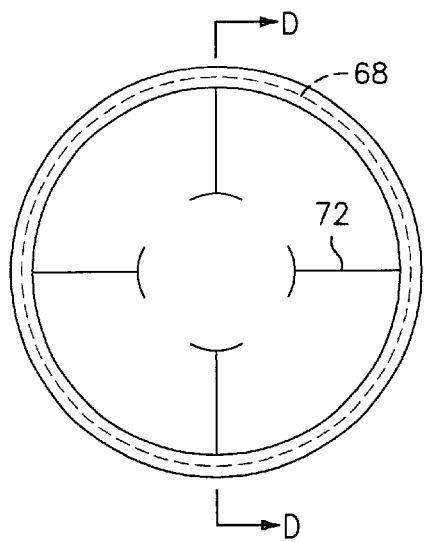
FIG. 5 is a top plan view of the novel disc packaging device of the present invention illustrating fingers that extend from a frame carried by the side wall of the container and that provide center support for the disc media.
Figure 5A:
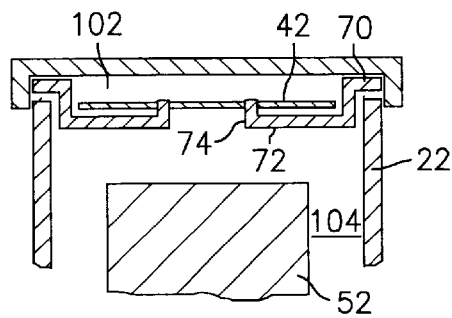
FIG. 5A is a cut-away, cross-sectional side view of the device shown in FIG. 5, alone, line D—D, with a disc media and other materials inserted and the lid affixed.

FIGS. 5 and 5A show a further alternative inner structure 68 comprising an annular collar 70 from which fingers 72 extend inwardly. At the ends of the fingers 72 are upstanding projections 74. The annular collar 70 nests inside the inner wall 26 and sits on the rim 28 in the same manner as the inner structure 40 in the embodiment shown in FIGS. 1 and 2. The upstanding projections 74 cooperate to provide a center support structure for the disc shaped media.

As seen in FIGS. 6A and 6B, the fingers 72 in the embodiment shown in FIGS. 5 and 5A do not necessarily need to be suspended from an annular collar. Alternatively, the could be clipped to the side wall 20 as seen in FIG. 6A or they could be screwed into the side wall 20 as shown in FIG. 6B.

In an alternative embodiment shown in FIG. 7, a center support structure is provided for the disc shaped media in the upper cover component 14. Specifically, projections 80 extend from the inside wall 82 of the end plate 18. These projections 80 cooperate to provide secure support for the disc shaped media in the cover component 14. A protective element 84 can be provided which is either removably nested within the cover as shown or which can be inserted at the time of manufacture and removed and discarded by the consumer after purchase. The cover 14 can engage the base component 12 in any variety Of conventional ways, e.g., snap on, telescope on, screw on, etc.

In a further alternative embodiment shown in FIG. 7A, the disc shaped media is encased within an envelope 84a made of plastic or some other suitable material and which is affixed to the inside wall 82 of the end plate 18. The envelope is either removably or permanently affixed, e.g., by gluing, with double-sided tape, or by other conventional means. The envelope can itself constitute a re-useable packaging container for the disc shaped media that either remains affixed to the plate 18 or can be removed from the plate 18, e.g., so that the cover 14 can be discarded. Or the disc shaped media can be packaged within a packaging sleeve (not shown) ail of which can then be inserted into the envelope and then removed from the envelope once the envelope is opened.

Figure 8:
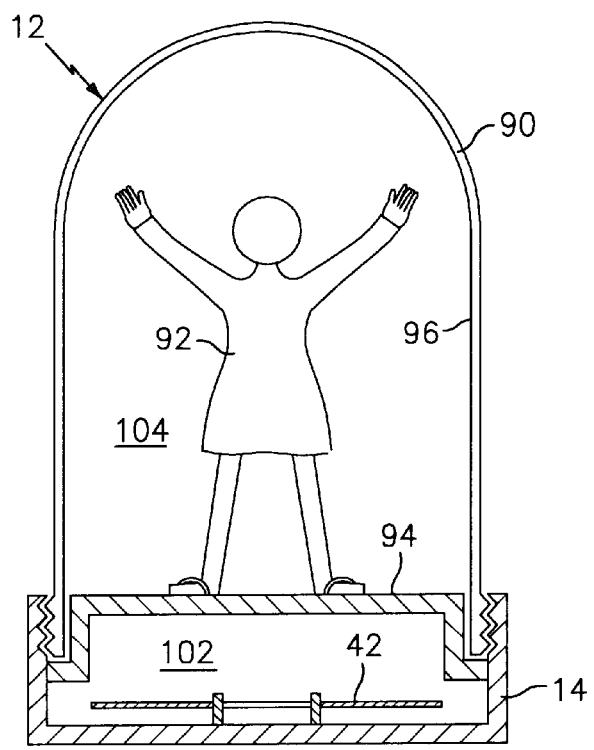
FIGS. 8 and 8A are side perspective, partially cut-away, cross-sectional views of alternative embodiments of the present invention, illustrating the use of the "lid" of the embodiment shown in FIG. 7 as the base, thereby allowing the portion of the invention defining the second chamber to be of an irregular shape (FIG. 8) or to have deformable construction (FIG. 8A)
Figure 8A:
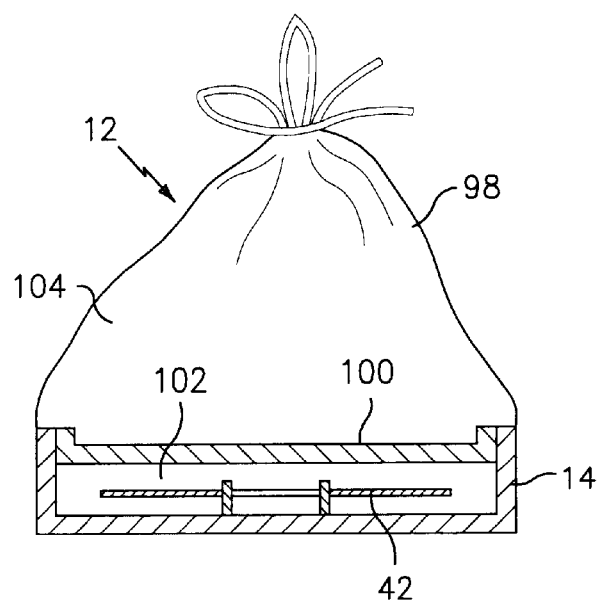

FIGS. 8 and 8A show further alternative embodiments of the present invention. In FIG. 8, the fact that the disc shaped media is stored within the cover component 14 allows for an alternative construction of the container 12. In this alternative embodiment, the cover 14 serves as the "base". The alternative base 90, in which the other materials, in this case, a doll 92, are stored, has an end wall structure 94 which frictionally encases the inner wall 96 and seals the chamber in the base 90. Alternatively, wall 94 can be provided with threads so that it will threadably engage corresponding threads on the inside wall 96. The cover 14 and base 90 can be attached in the same manner as heretofore been discussed in connection with other embodiments.

In the embodiment showing in FIG. 8A, the cover 14 once again carries the disc shaped media 42 and thereby allows the base 12 to be of a deformable construction 98. The deformable member 98 has a rigid internal support structure 100 which is designed to frictionally or threadably engage the cover 14.

Figure 9:
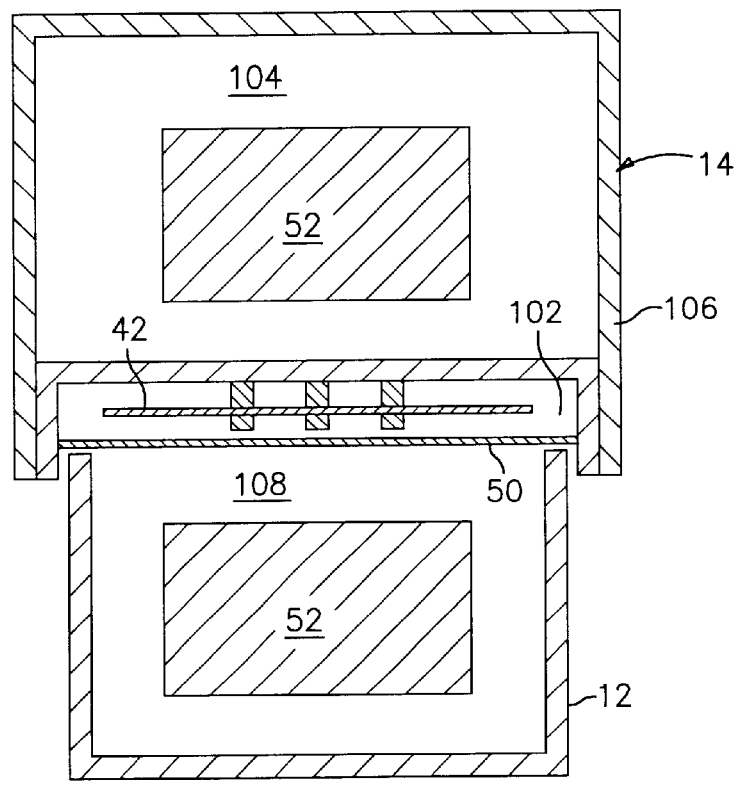
FIG. 9 is a cut-away, cross-sectional side view of an alternative embodiment of the present invention in which the disk media is located in the lid and the lid and the container include second and third chambers, respectively, for storing other material.
Figure 10:
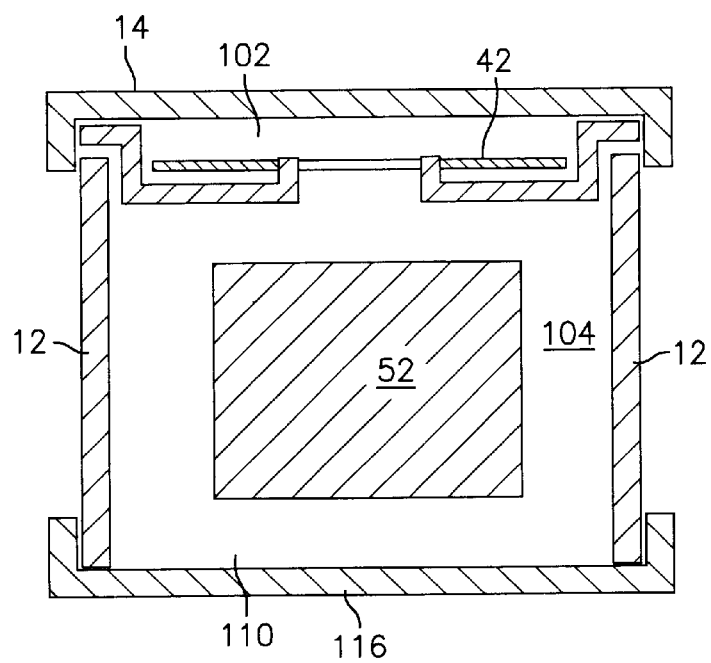
FIG. 10 is a cut-away, cross-sectional view of another embodiment of the present invention in which the second chamber in the container for storing other materials includes a second opening separate and distinct from the lid and a removable cover such that access to the second chamber can be attained without removing the lid.

In the alternate embodiment shown In FIG. 9, the disc shaped media is stored in a first chamber 102 in the lid 14 defined by an annular support 40 similar in construction to the embodiment of FIG. 7, except that the lid includes a second chamber 104 defined by an outer wall 106 for other materials and the base 12 includes a third chamber 108. In the alternate embodiment shown in FIG. 10, which is similar in construction to the embodiment of FIG. 4, there is provided an additional opening 110 in the container 22 and a cover 116 for closing the opening 110. The cover 116 can be removed to gain access to the chamber 104 without removing the cover 14.

Figure 11:
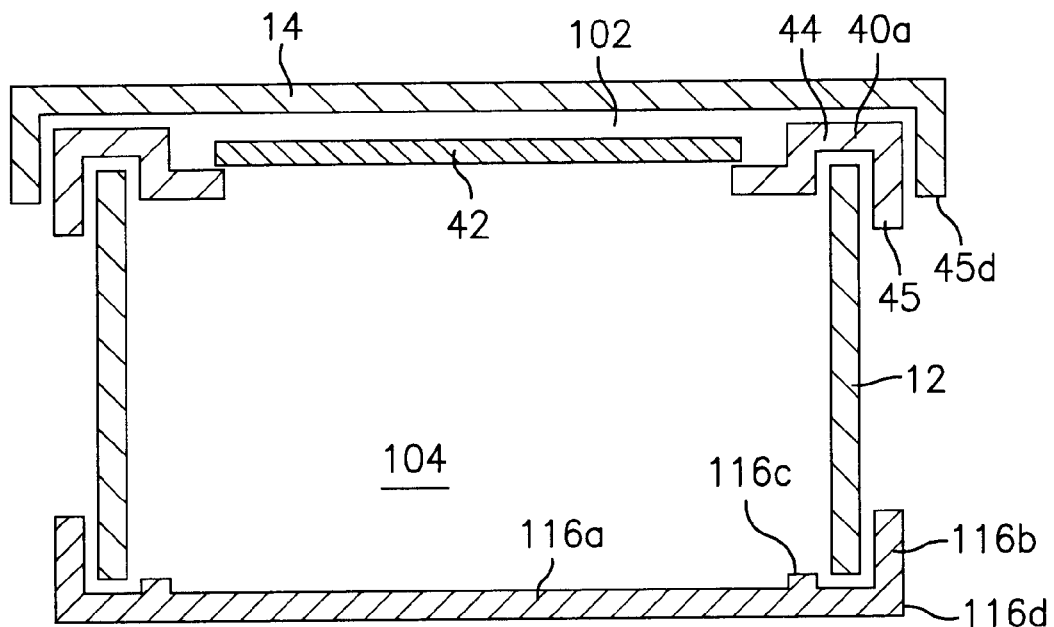
FIGS. 11 and 11A are cut-away, cross-sectional side views of another embodiment of the device shown in FIG. 10 in which the method of mounting shown in FIG. 6A is utilized and wherein the removable cover for the second chamber can be mated with the removable cover for the first chamber to form a mini-packaging device shown in FIG. 11A.
Figure 11A:
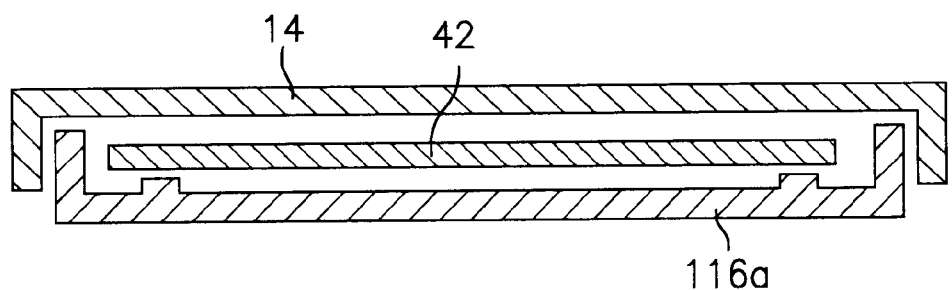

In the alternative embodiment shown in FIGS. 11 and 11A, an inner structure 40a is provided that is a slightly modified version of the inner structure 40 shown in FIG. 2, in that it includes an annular wall 45 that extends around the entire circumference of the annular collar 44 and engages the outer surface of the wall of the base 12, and the cover 14 is configured to engage not the base 12, but rather, the annular wall 45. An additional opening 110 is provided as in the embodiment of FIG. 10, and a cover 116a is provided that is a slightly modified version of the cover 116 of FIG. 10, in that it includes not only an outer annular wall 116b for engaging the outer surface of the wall of the base 12, but also an inner annular wall 116c for engaging the inner surface of the wall of the base 12. The circumferential dimension of the outer surface 116d of the wall 116b of the cover 116a is identical to the circumferential dimension of the outer surface 45d of the wall 45, such that the covers 14 and 116a can be removed and the cover 14 which matingly engaged the wall 45 will matingly engage the outer wall 116b of the cover 116a, as shown in FIG. 11A. In this way, as also shown in FIG. 11A, the covers 14 and 116a can be used together as a mini-packaging device for the disc shaped media 42. In the embodiment shown, the inner wall 116c helps to securely retain the disc shaped media against movement. However, it is understood that the benefits of the invention could be achieved without such inner wall, or utilizing one of the other retaining methods disclosed herein.

Figure 12:
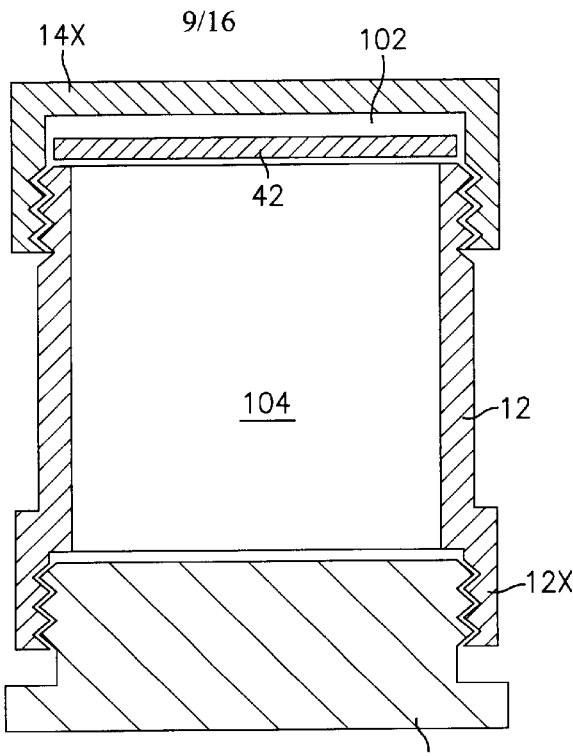
FIG. 12 is a cut-away, cross-sectional side view of an alternative embodiment of the device shown in FIGS. 11 and 11A in which the method shown in FIG. 3B for retaining the disc media is utilized and in which the two covers threadably engage the base and, when removed, can be threaded together to create a mini-packaging unit.

In the alternative embodiment shown in FIG. 12, the disc shaped media seats on the rim 28 as in the embodiment shown in FIG. 3B, but the cover 14x does not snap onto the base 12, but rather, threadably engages it. Furthermore, the bottom 12x of the base 12 is flared outwardly and contains internal threads that are of the same dimension as the internal threads of the cover 14x. The cover 116x includes mating external threads such that the cover 116x can be threaded into the flared bottom 12x of base 12. In this way, the covers 14x and 116x can be removed from the base 12 and threadably engaged to form a mini-packaging unit for the disc shaped media.

Figure 12A:
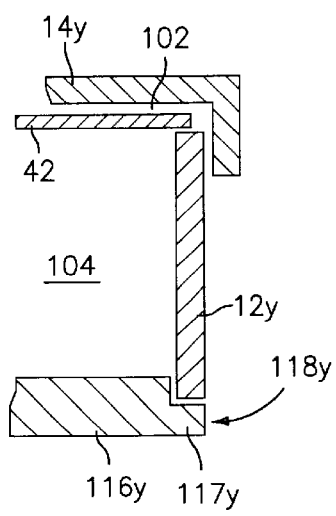
FIGS. 12A and 12B are cut-away, cross-sectional side views of alternative embodiments of the device shown in FIG. 12, wherein the two covers slidably engage after removal (FIG. 12A) or threadably engage after removal (FIG. 12B)
Figure 12B:
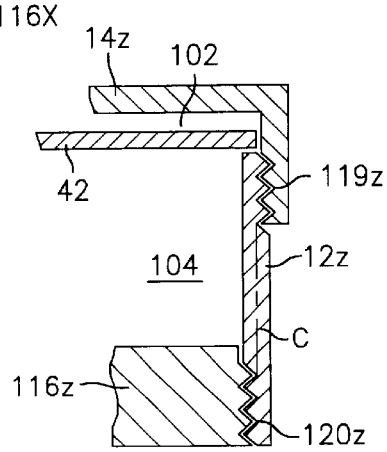

In the alternative embodiments of FIGS. 12A and 12B, the need to flare out the bottom of the base 12 is eliminated. In FIG. 12A, the base 12y receives a bottom cover 116y that includes an overlapping portion 117y, the outer surface 118y of which is of equal dimension to the outer surface 118y of which is of equal dimension to the outer wall of the base 12y, such that covers 14y and 11y can be slidably engaged to form a mini-storage unit for the disc media. In FIG. 12B, the base 12z has an external threaded portion 119z and an internal threaded portion 120z each of which extends beyond the center line "C" of the wall of the base 12z. In this way, when the covers 14z and 1 16z are removed, they can be threadably engaged to form a mini-storage unit for the disc media.

Figure 13:
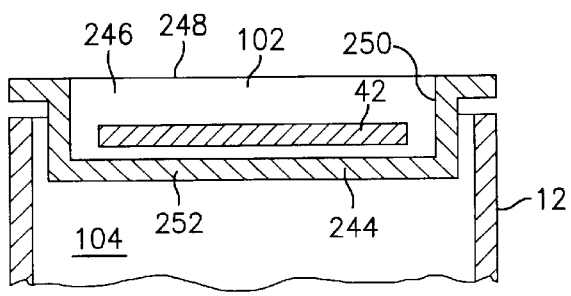
FIG. 13 is a cut-away, cross-sectional side view of another embodiment of the present invention in which a concave cavity on the exterior side of the cover for the device forms the first chamber for the disc media and a seal encloses the disc media within the concave cavity.

FIG. 13 shows a further alternative embodiment, wherein the cover 244 nestingly seats within the base 12 and the disc shaped media 42 is placed within the concave recess 246 of the cover 244. A seal 248 made of plastic or other suitable material is applied to the cover 244 to hold the disc shaped media within the cover 244 until the seal is removed by the user. The disc shaped media can be retained against movement within the cover 244 as a result of contact with the side walls 250, bottom wall 252 and seal 248, or by utilization of any of the other methods taught herein.

Figure 14:
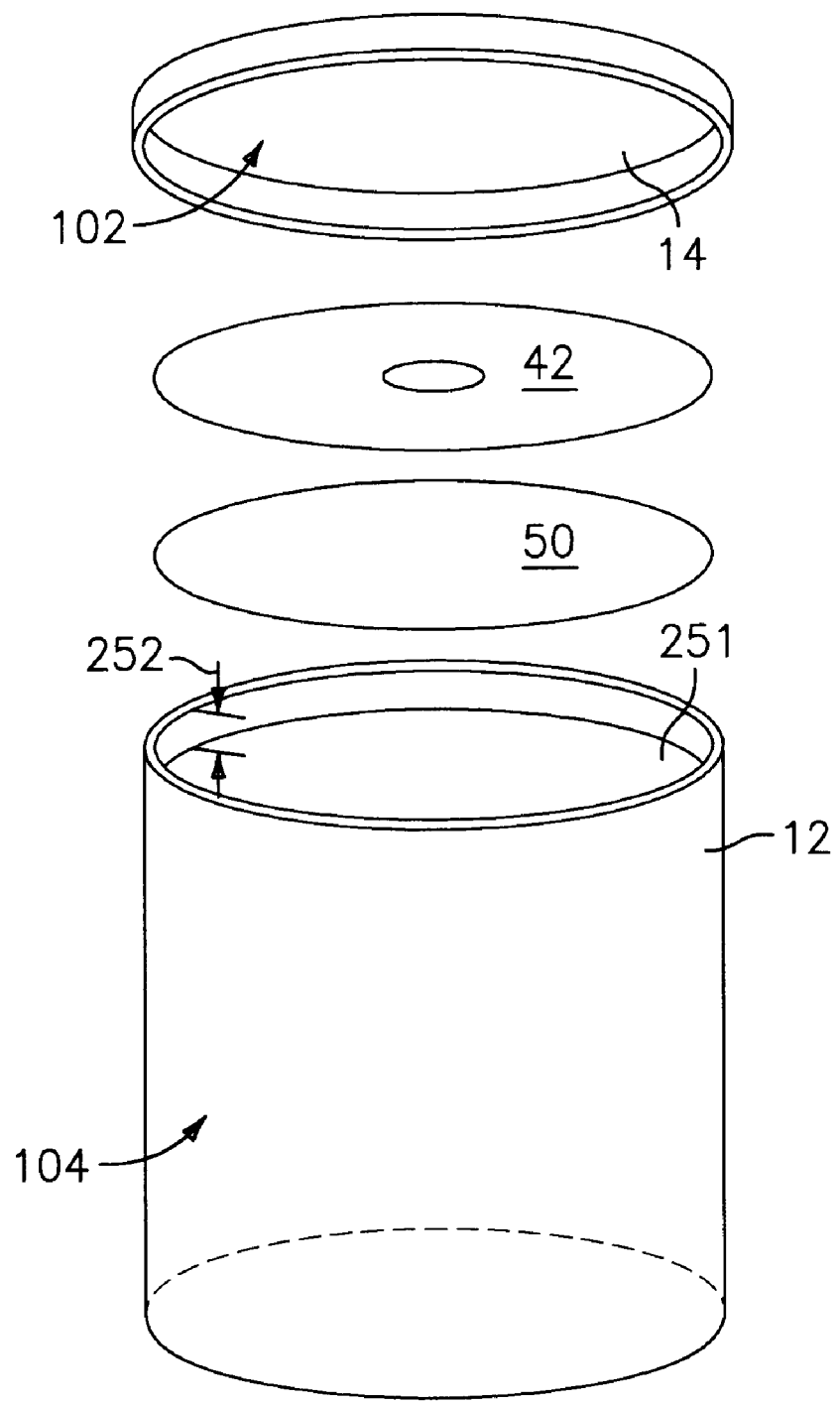
FIG. 14 is an exploded perspective view of a further alternative embodiment of the novel disc packaging device of the present invention with the lid, disk media and protective element removed, illustrating the use of a sealed base.

FIG. 14 shows a further alternative embodiment wherein the base 12 is a separately manufactured container of miscellaneous content, that includes a slightly concave end 25 1, the depth 252 of which exceeds the combined thickness of a disc shaped media 42 and a protective element 50 which are seated within the concave end 251 and held there by cover 14 which snaps onto base 12. In an alternate embodiment, a protective element is not used or the disc shaped media is packaged in an envelope (not shown).

Figure 15:
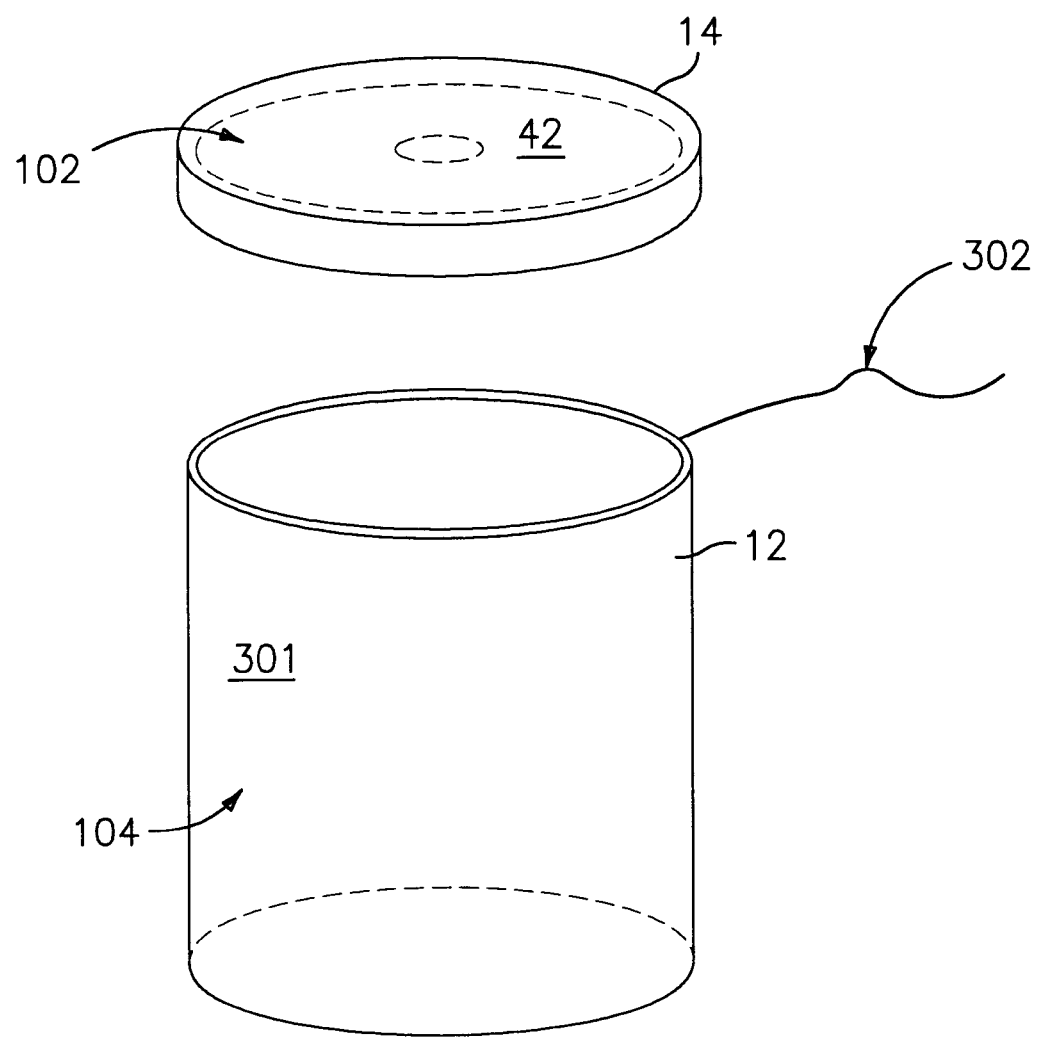
FIG. 15 is an exploded perspective view of a further alternative embodiment of the novel disc packaging device of the present invention in which the disk media is sealed within the lid, and the base is separately sealed, and the lid and base are detachably joined together by an outer packaging skin that can be severed with a pull string.

FIG. 15 shows a further alternative embodiment wherein the disc shaped media is mounted and sealed within cover 14, e.g., as taught herein in connection with other embodiments, and cover 14 is attached to base 12 by paper packaging material skin that binds the cover 14 and base 12 together. Cover 14 is separated from base 12 by pulling string 302 which tears the skin 301 and brakes the circumferential attachment between cover 14 and base 12.

It would be understood that in each embodiment, a container device is provided in which disc shaped media can be packaged, distributed, displayed at retail and, if desired, restored with other materials and that, in effecting such usage, discrete chambers are provided for the disc media and for the other materials so as to prevent contact between the disc media and the other materials. In the embodiments shown in FIGS. 1 through 6B, the inner structure, whether it is the annular collar of FIG. 1, or the discretely positioned abutment/protrusion clips of FIG. 3, or the upstanding rim in FIG. 3B, or the lid and supplemental lid of FIG. 3C, or the "spider" structure of FIG. 4, or the "trap" structure of FIG. 5, in each case is located in and helps define a first chamber in the lower base component 12. Underneath this first chamber is a second chamber. The first chamber receives and securely holds, despite repeated removal and re-packaging, the disc shaped media. The second chamber receives the other materials and keeps these materials separate from the disc shaped media. The need for a separate "jewel case" for the disc shaped media is thus completely eliminated.

It would be understood that the shape of the container can be varied without departing from the scope of the present invention, e.g., the cylindrical base 12 can be square or rectangular so long as the outer wall of the collar 40 corresponds and the collar includes spacers from the outer wall of the collar to the annular ring and annular lip of the present invention. Similar adjustments could be made to the other embodiments as would be apparent to those skilled in the an having reviewed this disclosure. The abutment/protrusions clips of FIG. 3 could be mounted on a non-cylindrical shaped base, as could the spider structure of FIG. 4 or the trap structure of FIG. 5.

It would be understood by those skilled in the art that the function of the annular ring of FIG. 1 or the abutments of FIG. 2 could be performed by an appropriately dimensioned inner wall 26 of the container 12.

It would be further understood that while several methods of attaching the annular collar of FIG. 1, the abutment/protrusion clips of FIG. 2, the spider structure of FIG. 3 and the trap structure of FIG. 4 have been shown, those skilled in the alt after having reviewed this disclosure could devise other means of attachment without departing from the scope of the present invention.

It would be further understood by those skilled in the art that the device and method of this invention can accommodate one or more disc shaped media, e.g., through the insertion of protective elements therebetween.

Figure 17A:
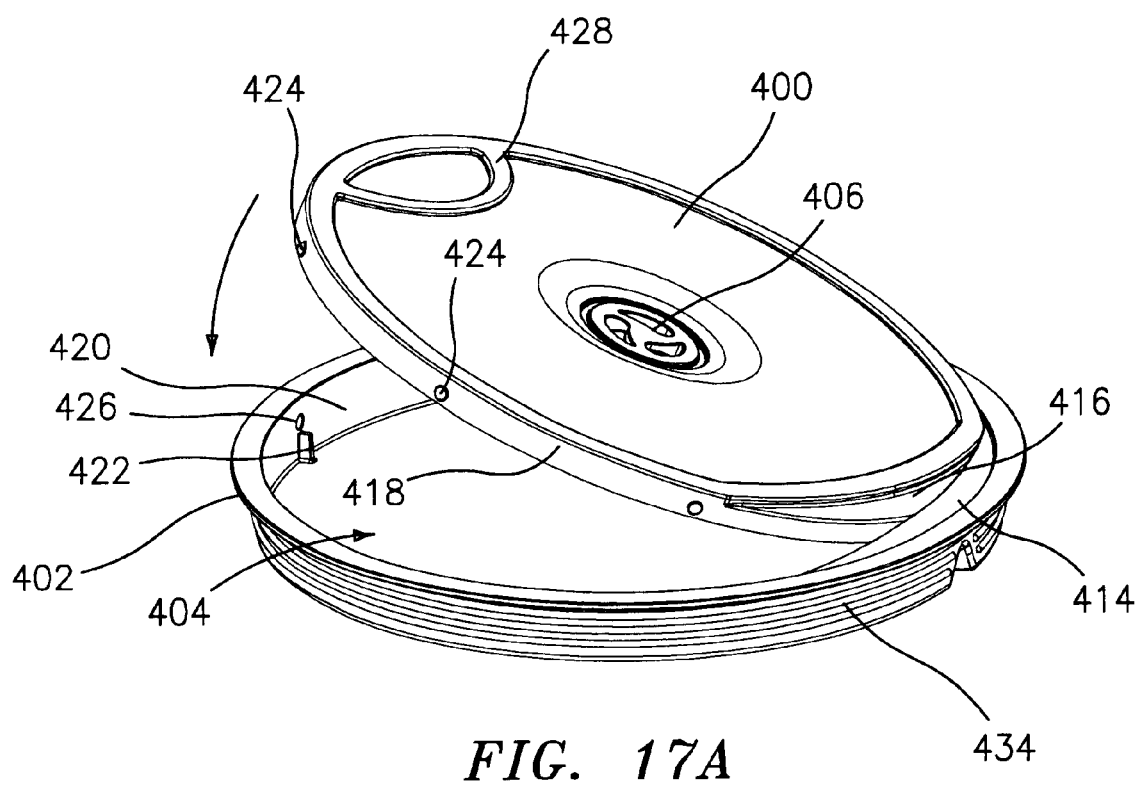
FIG. 17A is an exploded perspective view of the embodiment of FIG. 16 showing the manner in which the lid of the device is attached to the container.

Illustrated in FIGS. 16–18 is another embodiment of the present invention having a lid 400 adapted to receive the disc-shaped media 42, which lid is further adapted to be received by and retained within a cylindrical plug container 402 having an opening 404 therein. Toward that end, the outer diameter of lid 400 is slightly less than the diameter of the opening 404.

A center support structure 406 is provided in the center of lid 400 for receiving and retaining the disc-shaped media 42. Said lid support structure 406 includes at least one support projection 408 which extends from the inside surface 410 of the lid 400. These projections 408 are adapted to be inserted within the central aperture 412 of the disc-shaped media 42 such that the disc-shaped media 42 is prevented from moving linearly either perpendicularly or parallel to the plane of the disc-shaped media 42, while allowing the disc-shaped media 42 to rotate around the lid support structure 406.

Lid 400 is partially retained within plug container 402 by means of arcuate lip 414 which engages a corresponding indentation 416 in lid 400, such that lid 400 must be inserted into plug container 402 at a bias wherein indentation 416 is positioned under arcuate lip 414 prior to inserting the entire lid 400 within the opening 404 in plug container 402. Said arcuate lip 414 also helps to prevent the accidental removal of lid 400 from plug container 402.

It should be appreciated that lid 400 fits within the opening 404 of plug container 402 such that the outer rim 418 of lid 400 comes in contact with the inner surface 420 of the plug container 402. Lid 400 is prevented from being inserted too far into plug container 402 by means of a plurality of stop blocks 422, which engage the outer rim 418 of lid 400. Lid 400 is retained in position within plug container 402 by means of friction between outer rim 418 and inner surface 420, as well as by means of engagement of arcuate lip 414 and indentation 416.

Additional and alternative means for retaining lid 400 within plug container 402 can be employed. For example, snapping means may be provided comprising a plurality of protrusions 424 on the lid 400 which are engaged within corresponding concavities 426 in the plug container 402 when the lid 400 is inserted within the opening 404 of the plug container 402. Similarly, lid 400 may be attached to plug container 402 by means of threaded screws (not shown). In such an embodiment arcuate lip 414 and indentation 416 would no longer be necessary or practical. Additionally, the center support structure could be mounted on plug container 402, e.g., utilizing the means disclosed in FIGS. 4–5A, 8, 8A and 10.

A flexible handle 428 is also provided on the lid 400 at the edge opposite that of the indentation 416. The handle 428 is necessary to remove the lid 400 from the plug container 402, since when the lid 400 is inserted into plug container 402, the surface of the assembled container 430 is substantially flush, such that there are no means for grasping lid 400. The handle 428 is provided at the opposite edge from the indentation 416 in order to bias the lid 400 during removal such that the indentation 416 may be slid out from under arcuate lip 414.

The assembled container 430 may be used as a plug to seal the opening of a cylindrical shipping or packaging container (not shown) containing other materials. The assembled container 430 may be inserted within such cylindrical shipping or packaging container having an inner diameter only slightly larger than the outer diameter of the assembled container 430, such that the assembled container 430 would be in frictional contact with the inner surface of the cylindrical shipping or packaging container. An annular collar 432 may be provided on the upper portion of the plug container 402 in order to limit the extent of insertion of the assembled container 430 into the cylindrical shipping or packaging container and to protect the rim of the cylindrical shipping or packaging container against damage.

A variety of additional and alternative means exist for retaining the assembled container 430 within the cylindrical shipping or packaging container during transport and storage thereof. For example, a plurality of annular fins 434 are shown which may be provided on the outer surface of the assembled container 430, which fins 434 engage the inner surface of the cylindrical shipping or packaging container.

Alternatively, the assembled container 430 may be screwed or snapped into the cylindrical shipping or packaging container or be retained therein by some adhesive means e.g., a plastic sleeve or "safety seal" that is shrink wrapped over the collar 432 of the assembled container 430 and the side of the cylindrical shipping and packaging container, or it may be lightly restrained by the friction between the outer walls of the assembled container 430 as inserted against the inner walls of the cylindrical packaging or shipping container.

Figure 20A:
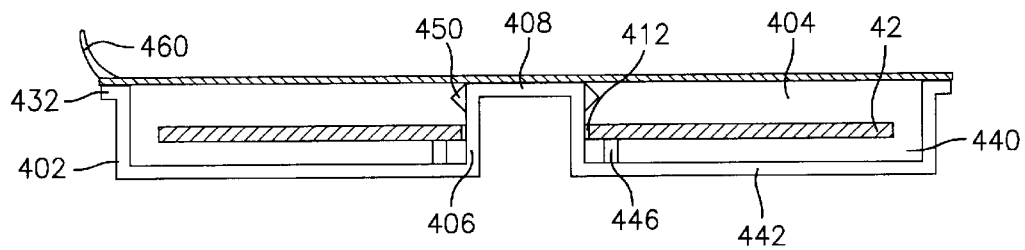
FIGS. 20A and 20B are cut-away, cross-sectional views of an alternative embodiment of the present invention in which the disc media is inserted into a plug-type member and secured therein by means of a flexible seal.
Figure 20B:
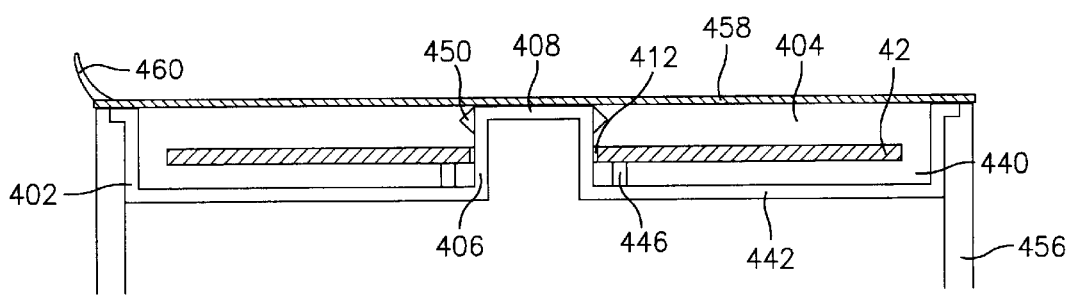
Figure 21A:
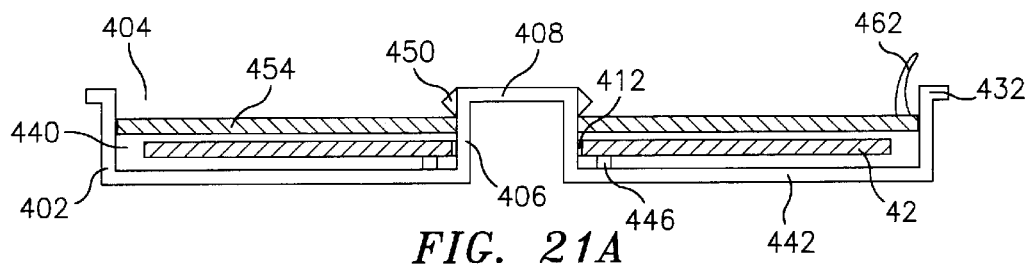
FIGS. 21A, 21B and 21C are cut-away, cross-sectional views of an alternative embodiment of the present invention in which the disc media is inserted into a plug-type member and secured therein by means of a paperboard seal.
Figure 21B:
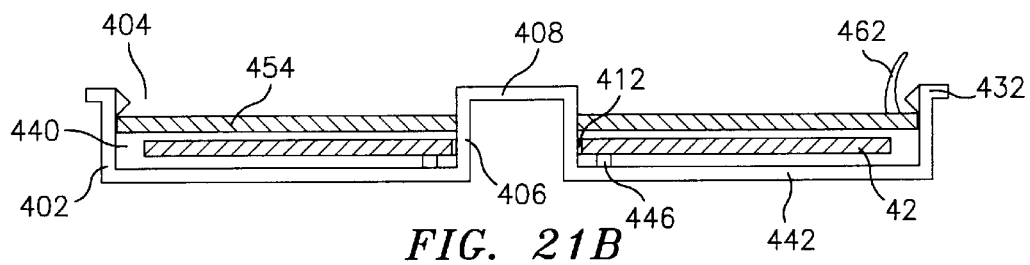
Figure 21C:
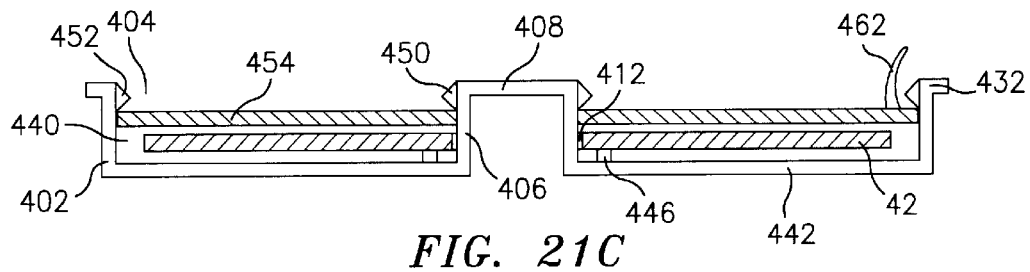
Figure 22A:
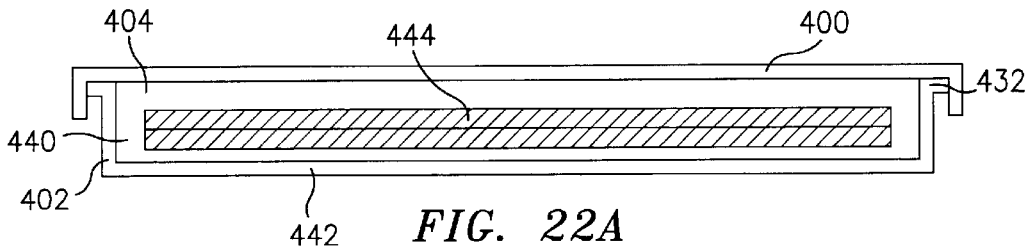
FIGS. 22A, 22B and 22C are cut-away, cross-sectional views of an alternative embodiment of the present invention in which the disc media is inserted first into a protective element, which protective element is then inserted into a plug-type member and secured therein by various means.
Figure 22B:
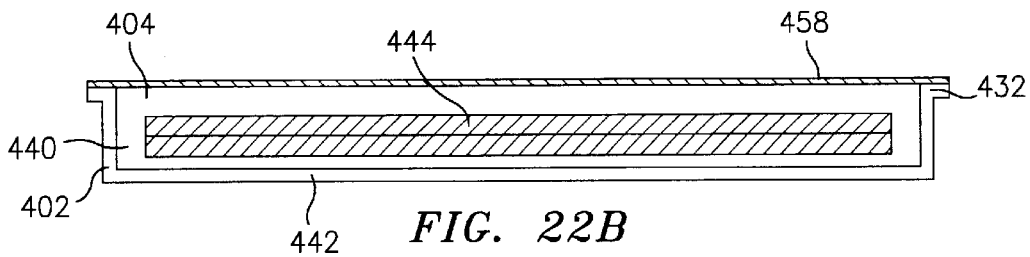
Figure 22C:
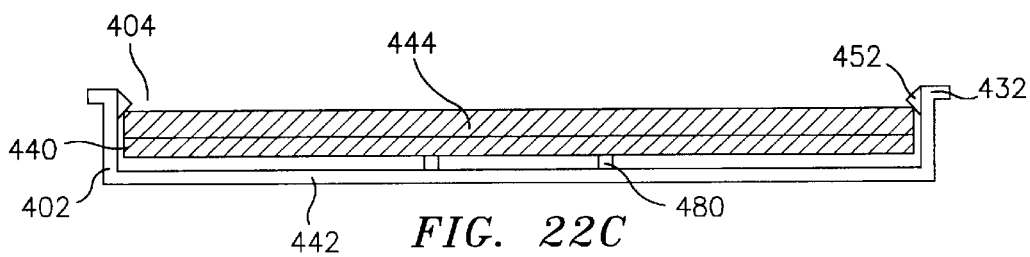

Another embodiment of the present invention is illustrated in FIGS. 19A–22C wherein the cylindrical plug container 402 includes a cavity 440 in which the disc-shaped media 42 may be received and retained, either on a center support structure 406 extending from the floor 442 of the cavity 440, as shown in FIGS. 19A–21C, or within a protective casing 444 as shown in FIGS. 22A–22C.

FIGS. 19A–21C illustrate some of the variety of ways in which the disc-shaped media 42 is securely retained on the center support structure 406. It should be appreciated that in each of these embodiments is shown at least one raised collar portion 446 is situated on the floor 442 of the cavity 440, which collar portion 446 is designed to separate the disc-shaped media 42 from the floor 442, thereby preventing contact between the media side of the disc-shaped media and the floor 442, which contact potentially could result in damage to the media side of the disc-shaped media. In the preferred embodiment, the raised collar portion 446 is a continuous annular collar having an external diameter slightly larger than the diameter of the central aperture 412 of the disc-shaped media 42 but less than the inner diameter of the media portion thereof, such that the collar portion 446 comes into contact with the disc-shaped media 42 but does not contact the media portion of the disc-shaped media. In an alternative embodiment, the raised collar portion 446 may consist of one or more discrete projections from the floor 442 of the cavity 440. In a further embodiment, there is no collar portion 446 but instead either a protective annular element 447 is installed on the center support structure 406 before the disc 42, so that the protective element 447 separates the disc 42 from contact with the floor 442, as seen in FIG. 19B, or the contact between the disc 42 and floor 442 is allowed, e.g., if minimal interaction therebetween is contemplated or if the disc can be "hardened" or the floor can be made acceptably smooth or non-abrasive to the media side of the disc-shaped media 42.

It should also be appreciated that in the embodiments illustrated in FIGS. 19A–21C, the center support structure 406 may include one or more internal projections 450 or the wall 448 of the cavity may include one ore more external projections 452. Said internal and external projections 450, 452 are designed to assist in the retention of the disc-shaped media 42 upon the support structure 406, as well as receive and retain a protective element 454 (as shown in FIGS. 21A–21C).

Figure 19A:
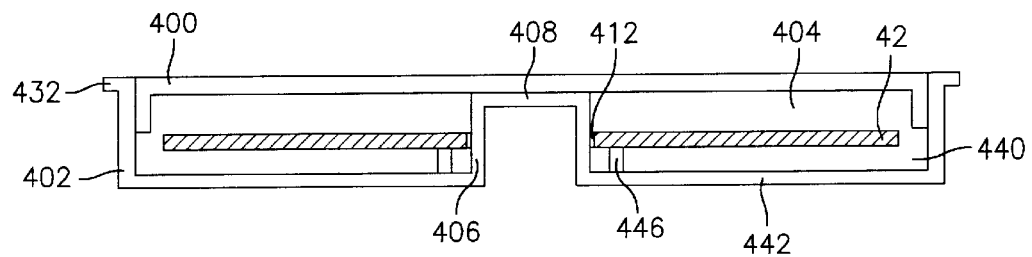
FIGS. 19A and 19B are cut-away, cross-sectional views of an alternative embodiment of the present invention in which the disc media is inserted into a plug-type member and secured therein by means of a lid.
Figure 19B:
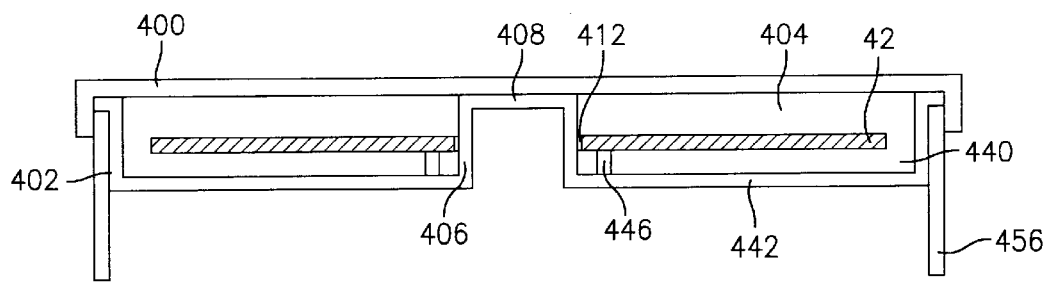

Returning to the embodiments wherein the disc-shaped media 42 is received and retained by a center support structure 406, FIGS. 19A–19B illustrate the use of a lid 400 to keep the disc-shaped media 42 in place on the structure 406. In the embodiment of FIG. 19A, the lid 400 is adapted to be inserted within the opening 404 to the plug container 402 to thereby close and seal the cavity 440. In order to keep the disc-shaped media 42 on the center support structure 406, particularly when said structure 406 does not include inner projections 450, the lid 400 should contact the upper surface of the center support structure 406. This is also true in the embodiment of FIG. 19B, in which the lid 400 is adapted to be attached over both the plug container 402. In the embodiment shown in FIG. 19B, the lid 400 is adapted to go over both the plug container 402 and the packaging container 456 to thereby close and seal both containers 402, 456. In both the embodiments of FIGS. 19A and 19B, the lid 400 is preferably attached and secured to the plug container 402 and/or packaging container 456 by means of a compression fit, although a variety of other attachment means are contemplated, including snaps, tabs and adhesives.

In the embodiment shown in FIGS. 20A–20B, the disc-shaped media is held onto the center support structure 406, as well as protected within a substantially air- or water-tight environment in the cavity 440, by means of a seal 458. In the preferred embodiment, the seal 458 comprises a shrink-wrapped plastic, although other sealing methods may be equally as effective, including heat sealing plastic, foil seal or use of an adhesive. In the embodiment of FIG. 20A, the seal 458 is attached about the upper surface of the annular collar 432, and may also be attached to the upper portion of the center support structure 406. The sealed plug container 402 of such embodiment may then be inserted into the opening of the packaging container 456. Alternatively, the seal 458 may be attached to both the plug container 402 and the packaging container 456 once the plug container 402 has been inserted into the packaging container 456, in the manner shown in FIG. 20B, albeit, in such embodiment the seal 458 is attached to both the upper surface of the annular collar 432 as well as to the upper surface of the rim of the packaging container 456.

In both the embodiments of FIGS. 20A and 20B, a seal tab 460 is also provided, which tab 460 is designed to allow a user to remove the seal 458 from the plug container 402 in order to gain access to the cavity 440 (as well as the packaging container 456, after removal of plug container 402, as seen in FIG. 20B).

Another means for retaining the disc-shaped media 42 on the center support structure 406 is illustrated in FIGS. 21A through 21C, in which a protective element 454 is also inserted within the opening 404 of the plug container 402. In the preferred embodiment, the protective element 454 is annular in shape and is composed of paperboard or plasticized paper, although other shapes dimensioned to engage projections 450 and/or projections 452, and other materials such as plastic would be equally as effective. In the embodiment of FIG. 21A, the protective element 454 is annular in shape and is snapped under the inner projections 450 on the center support structure 406, while in FIG. 21B, the protective element 454 is annular in shape and is snapped under the outer projections 452 on the wall 448 of the cavity 440. FIG. 21C illustrates the protective element 454 being annular in shape and snapped under both inner and outer projections 450, 452. It should be appreciated that in the embodiment of FIGS. 21A–21C, the center support structure 406 must be at least as tall as the thickness of the disc-shaped media 42, protective element 454 and raised collar portion 446 combined. In such embodiments, a pull tab 462 may also be included as part of the protective element 454 in order to facilitate the removal of the protective element from the projections 450, 452.

An alternative to the use of the center support structure 406 is illustrated in FIGS. 22A–22C, in which the disc-shaped media 42 is stored within a protective casing 444. Said casing may consist of a protective envelope in which the disc-shaped media 42 may be slid into and out of, or, alternatively, may consist of a clam shell-like device having a pair of complementary mating members attached by interlocking snap means or by means of a flexible hinge or a combination of the two. In the embodiment of FIG. 22A, the protective casing 444 is retained within the cavity 440 by means of a lid 400. In such embodiment, the protective casing 444 may be loosely stored within the cavity 440, or, alternatively, removably attached to either the lid 400 or the floor 442.

Alternatively, as shown in FIG. 22B, the protective casing 444 may be retained within the cavity 440 by means of a seal 458, which seal 458 may be attached by means of shrink-wrapping, heat sealing, adhesives or similar attaching means. Finally, as shown in FIG. 22C, the protective casing 444 may be retained within the cavity 440 by means of at least one outer projection 452. In such embodiment, the protective casing 444 may be snapped in place under said projection 452. Protrusions 480 are optionally provided that extend from floor 442 and are sized so that casing 444 fits snugly between projections 452 and protrusions 480 in a manner as to preclude "rattling" movement of casing 444 within cavity 440.

Figure 24:
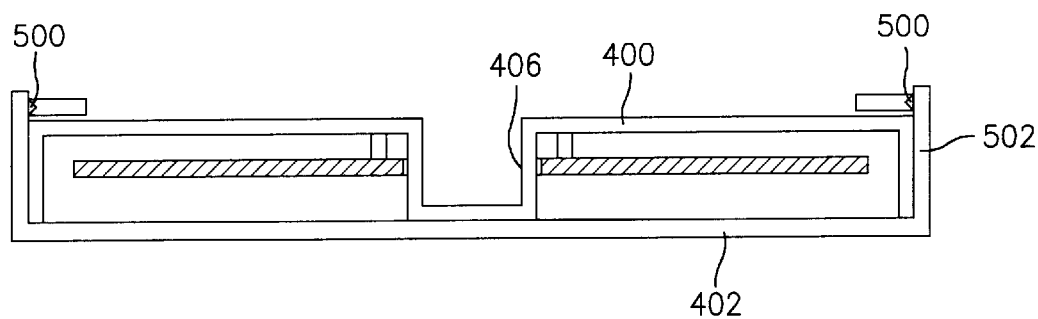
FIG. 24 is a cut-away, cross-sectional view of the embodiment of FIG. 23.
Figure 23:
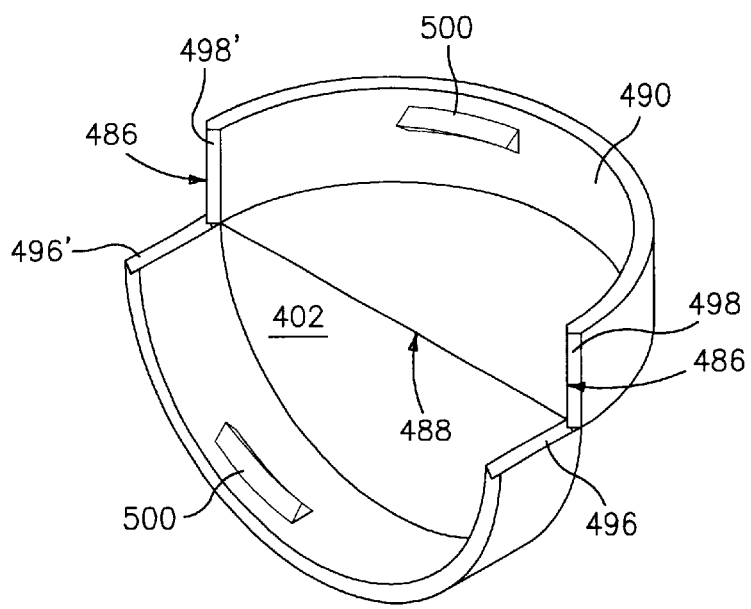
FIG. 23 is a perspective view of an alternative embodiment of the present invention in which the plug-type member includes a scored line in the floor thereof, said scored line extending between two cut portions of the side wall of the plug-type member, so as to allow the plug type member to be biased open.
Figure 23A:
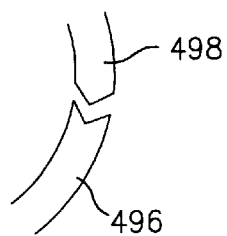
FIGS. 23A and 23B are cross-sectional views of the mating portions of the wall of the embodiment of FIG. 23.
Figure 23B:
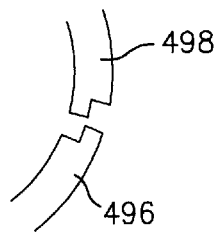

In all of the embodiments of FIGS. 19A–22C, in a manner shown in FIG. 23, opposed points 486 of wall 490 and the floor 442 along a line 488 therebetween of the plug container 402 may also be scored or otherwise cut so as to allow the plug container 402, or a portion thereof, to be split or hingedly broken open, i.e., where the floor acts as a living hinge along the aforementioned line 488, thereby granting access to the cavity 440 and the disc-shaped media 42 stored therein. Such a break-open plug container 402 allows the disc-shaped media 42, whether alone, in a protective envelope or clam shell-like container to be inserted into and removed from the cavity 440 by opening and closing the plug container 402 along the break. Upon closing, the opposing faces 496, 498 and 496', 498' return to abutting relationship. In alternative embodiments shown in FIGS. 23A and 23B, the opposing faces 496, 498 can be configured with mating male, female designs to further ensure the faces do not shift relative to each other when the plug container 402 is in the closed position. It should be understood that a variety of mating designs exist that could be used for the opposing faces without departing from the scope of this invention. Alternatively, the disc-shaped media 42 and/or the lid 400 may be attached to the center support structure 406 when the plug container 402 is split open, and therein retained when the plug container is closed. In the further embodiment seen in FIG. 24, the center support structure 406 can be mounted on the lid 400, which lid 400 can be slid under outer projections 500 on wall 502 of the plug container 402 when the plug is hinged open along line 488.

Having thus described the invention with particular reference to the preferred forms thereof, it will be obvious that various changes and modifications can be made therein without departing from the spirit and scope of the present invention as defined by the appended claims.

What is claimed is:

1. A packaging device comprising:
   at least one disc-shaped media having an aperture therethrough;
   a first member having a first chamber for receiving said disc-shaped media, said first member including a first opening for providing access into said first chamber;
   a second member having a second chamber for receiving materials other than said disc-shaped media, said second member including a second opening for providing access into said second chamber, wherein said first member is adapted to be removably attached to said second member about said second opening to thereby cover said second opening; and
   means for supporting and protecting said recording media within said first chamber against lineal movement in either the plane of the recording media or perpendicular to the plane of the recording media, while simultaneously allowing the recording media to rotate about the axis perpendicular to the plane of the recording media within said first chamber.

2. The packaging device of claim 1, wherein said first member comprises a plug container and said means for supporting and protecting said recording media is mounted on said plug container.

3. The packaging device of claim 2, wherein said plug container further includes a first interior surface and a first exterior surface and said recording media includes an annular center aperture, and wherein said means for supporting and protecting comprises a center support mounted on and extending from said first interior surface of said plug container adapted to be inserted into and engaged within said annular center aperture.

4. The packaging device of claim 3, said center support includes at least one inner projection to secure said disc on said center support.

5. The packaging device of claim 4, wherein said first interior surface further includes a collar portion extending from said first interior surface disposed about said means for supporting and protecting, said collar portion being adapted to prevent said disc-shaped media from contacting said first interior surface.

6. The packaging device of claim 3, further including a removable lid, wherein said disc-shaped media is retained on said means for supporting and protecting by means of contact between said means for supporting and protecting and said removable lid.

7. The packaging device of claim 6, wherein said lid is adapted to be inserted within said first opening and retained therein by means of a compression fit.

8. The packaging device of claim 6, wherein said lid is adapted to cover both said first member and said second member, and retained thereon by means of a compression fit with said second member.

9. The packaging device of claim 3, further including a sealing member, wherein said disc-shaped media is retained on said means for supporting and protecting by means of contact between said means for supporting and protecting and said sealing member.

10. The packaging device of claim 9, wherein said sealing member comprises a shrink-wrapped plastic.

11. The packaging device of claim 9, wherein said sealing member comprises a foil seal.

12. The packaging device of claim 9, wherein said sealing member comprises a paperboard seal.

13. The packaging device of claim 9, wherein said sealing member completely covers said first member.

14. The packaging device of claim 9, wherein said sealing member completely covers both said first member and said second member.

15. The packaging device of claim 4, further including a removable protective element, wherein said protective element and said disc-shaped media are retained on said center support by means of contact between said protective element and said inner projection.

16. The packaging device of claim 2, further including a removable protective element, wherein said plug container includes at least one outer projection disposed about said first opening, and wherein said protective element and said disc-shaped media are retained on said means for supporting and protecting by means of contact between said protective element and said outer projection.

17. The packaging device of claim 4, further including a removable protective element, wherein said plug container includes at least one outer projection disposed about said first opening, wherein said protective element and said disc-shaped media are retained on said center support by means of contact between said protective element and said inner and outer projections.

18. The packaging device of claim 1, wherein said means for supporting and protecting said recording media comprises a protective casing, wherein said protective casing comprises a protective envelope including an opening therein for receiving and retaining said disc-shaped media.

19. The packaging device of claim 18, wherein said protective casing comprises a protective envelope including an opening therein for receiving and retaining said disc-shaped media.

20. The packaging device of claim 18, wherein said protective casing comprises a container having two complementary interlocking members, said container being adapted to receive and retain said disc-shaped media.

21. The packaging device of claim 20, wherein said complementary interlocking members are attached by a flexible hinge.

22. The packaging device of claim 20, wherein said complementary interlocking members are attached by snap means.

23. The packaging device of claim 20, wherein said complementary interlocking members are attached by a combination of a flexible hinge and snap means.

24. The packaging device of claim 18, further including a lid adapted to close and secure said first opening, wherein said protective casing is retained within said first member by said lid.

25. The packaging device of claim 18, further including protective seal disposed about said first opening, wherein said protective casing is retained within said first member by said protective seal.

26. The packaging device of claim 18, further including at least one outer projection disposed about said first opening, wherein said protective casing is retained within said first member by said at least one outer projection.

27. The packaging device of claim 26, wherein said first member comprises a plug container and wherein said plug container further includes a first interior surface and a first exterior surface, wherein said plug container further includes a collar portion extending from said first interior surface, said collar portion adapted to hold said protective casing against said at least one outer projection.

28. The packaging device of claim 1, further including a sealing member, wherein said disc-shaped media is retained on said means for supporting and protecting by means of contact between said means for supporting and protecting and said sealing member.

29. The packaging device of claim 28, wherein said sealing member includes a pull tab for removing said sealing member.

30. The packaging device of claim 28, wherein said sealing member includes a notched cut-out for removing said sealing member.

31. The packaging device of claim 1, wherein said first member further includes means adapted to allow said first member to be broken apart along a pre-defined seam so as to provide side access to said first chamber.

32. The packaging device of claim 31, wherein said first member comprises a plug container, wherein said plug includes side walls and floor, wherein said hinged means comprises opposing cuts in said side walls and a score in the floor along a line between opposing cuts to allow said plug container to be bent about along said score line.

33. The packaging device of claim 32, wherein said side walls have outer projections adapted to receive and retain said disc-shaped media.

34. The packaging device of claim 33, wherein said opposing cuts each have mating faces, said mating faces being adapted to positively engage when said plug is closed.

35. The packaging device of claim 32, further including a lid including support means for said disc-shaped media, wherein said side walls include outer projections adapted to receive and retain said lid and disc.

36. The packaging device of claim 35, wherein said support means comprises a center support structure.

37. The packaging device of claim 31, further including a sealing member adapted to secure and protect said disc-shaped media within said first member.

38. A method for packaging disc-shaped media together with materials other than said disc-shaped media, said materials being stored in a storage device, said method comprising the steps of:
providing at least one disc-shaped media having an aperture therethrough;
providing a device for packaging said at least one disc-shaped media comprising:
a first member having a first chamber for receiving said at least one disc-shaped media, said first member including a first opening for providing access into said first chamber;
a second member having a second chamber for receiving materials other than said disc-shaped media, said second member including a second opening for providing access into said second chamber, wherein said first member is adapted to be removably attached to said second member about said second opening to thereby cover said second opening; and
means for supporting and protecting said disc-shaped media media within said first chamber against lineal movement in either the plane of the recording media or perpendicular to the plane of the recording media, while simultaneously allowing the recording media to rotate about the axis perpendicular to the plane of the recording media within said first chamber;
inserting said disc-shaped media into said first chamber;
removably attaching said disc-shaped media to said means for supporting and protecting;
removably attaching said first member to said second member.

39. The method of claim 38, farther including the step of sealing said disc-shaped media within said first chamber.

40. The method of claim 38, further including the step of sealing said disc-shaped media within a protective element prior to inserting it into said first chamber.

41. The method of claim 38, further including the steps of hingedly opening said first member prior to inserting said disc-shaped media, then hingedly closing said first member after said disc-shaped media has been inserted.

* * * * *